US000001109H

United States Statutory Invention Registration [19]

[11] Reg. Number: H1109

Roberts et al.

[43] Published: Oct. 6, 1992

[54] INSTRUMENT DISPLAY APPARATUS

[75] Inventors: John K. Roberts, Sheboygan, Wis.; Barnes W. Woodhall, San Diego, Calif.

[73] Assignee: K. W. Muth Company, Inc., Sheboygan, Wis.

[21] Appl. No.: 441,629

[22] Filed: Nov. 27, 1989

Related U.S. Application Data

[63] Continuation-in-part of Ser. No. 408,692, Sep. 18, 1989, which is a continuation-in-part of Ser. No. 310,644, Feb. 15, 1989, Pat. No. 5,005,009, which is a continuation-in-part of Ser. No. 156,122, Feb. 16, 1988, abandoned.

[51] Int. Cl.[5] ..... G02B 27/16

[52] U.S. Cl. ..... 340/705; 340/980; 359/630

[58] Field of Search ..... 340/705, 795, 945, 947, 340/980; 350/174; 361/23, 29, 30; 116/48, 49

[56] References Cited

U.S. PATENT DOCUMENTS

| | | |
|---|---|---|
| 3,163,949 | 1/1965 | Gley . |
| 3,230,819 | 1/1966 | Woxon . |
| 3,317,906 | 5/1967 | Baldbridge . |
| 3,574,283 | 4/1971 | Albers . |
| 3,798,529 | 3/1974 | Jones . |
| 3,829,196 | 8/1974 | Deb . |
| 3,881,809 | 5/1975 | Fergason et al. . |
| 3,887,273 | 6/1975 | Griffiths . |
| 3,915,548 | 10/1975 | Opittek et al. . |
| 4,190,832 | 2/1980 | Mohler . |
| 4,347,508 | 8/1982 | Spooner . |
| 4,398,799 | 8/1983 | Swift . |
| 4,449,024 | 3/1985 | Stracener . |
| 4,453,163 | 6/1984 | Garner et al. . |
| 4,560,233 | 12/1985 | Banbury . |
| 4,635,033 | 1/1987 | Inukai et al. . |
| 4,636,782 | 1/1987 | Nakamura et al. . |
| 4,652,870 | 3/1987 | Steward . |
| 4,740,780 | 4/1988 | Brown et al. . |
| 4,742,389 | 5/1988 | Schiffman . |
| 4,768,300 | 9/1988 | Rutili . |
| 4,795,223 | 1/1989 | Moss . |
| 4,831,366 | 5/1989 | Iino . |
| 4,839,589 | 6/1989 | Heinle . |
| 4,840,465 | 6/1989 | Loy et al. . |
| 4,847,555 | 7/1989 | Stammer et al. . |
| 5,005,009 | 4/1991 | Roberts . |

FOREIGN PATENT DOCUMENTS

| | | |
|---|---|---|
| 0216014 | 4/1987 | European Pat. Off. . |
| 0216692 | 4/1987 | European Pat. Off. . |
| 0088925 | 5/1985 | Japan . |
| 0012450 | 1/1986 | Japan . |
| 2154021 | 8/1985 | United Kingdom . |

*Primary Examiner*—Bernarr E. Gregory

[57] ABSTRACT

An instrument display apparatus for use in combination with a substantially transparent panel including an instrument to be displayed positioned adjacent to the transparent panel and which is adapted to reflect ambient light onto the substantially transparent panel, and an artificial lighting assembly which is adapted to selectively supply light to the instrument whereby a reflection of the instrument may be viewed in the windscreen regardless of level of ambient natural light.

70 Claims, 15 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

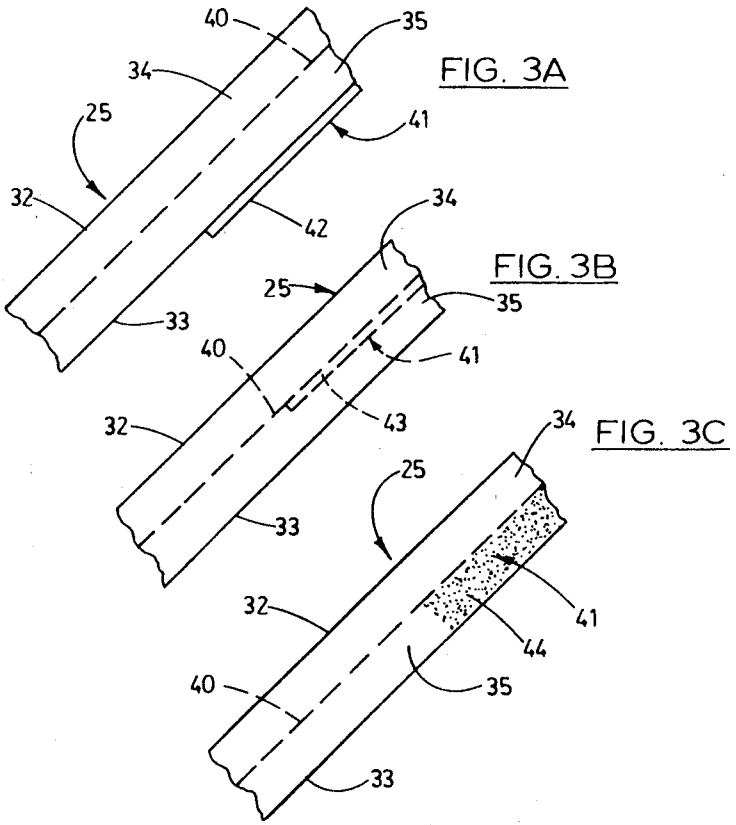
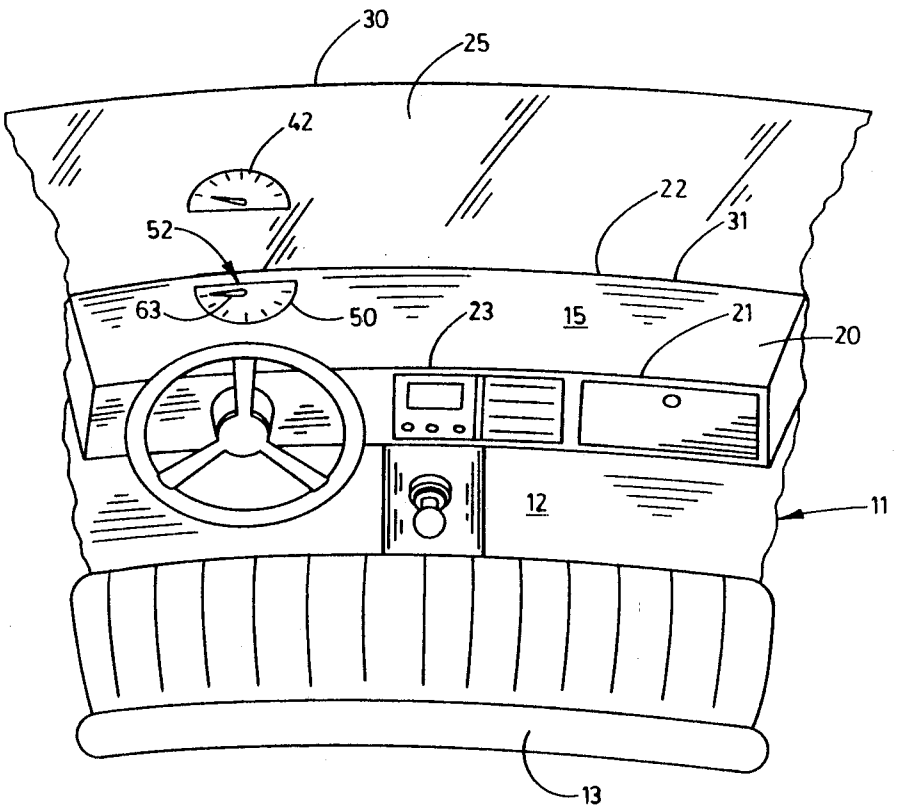
FIG. 2

INSTRUMENT DISPLAY APPARATUS

This patent application is a continuation-in-part of U.S. patent application Ser. No. 07/408,692 filed on Sep. 18, 1989 which is a continuation-in-part of U.S. patent application Ser. No. 07/310,644, now U.S. Pat. No. 5,005,009, which is a continuation-in-part of U.S. patent application Ser. No. 07/156,122, filed Feb. 16, 1988, now abandoned.

BACKGROUND OF THE INVENTION

1. Field of the Invention

The present invention relates to an instrument display apparatus and more particularly to such a device which is adapted to produce a reflected image of an instrument in a windscreen or other similar assembly such that an operator may view same while simultaneously viewing out through the windscreen.

2. Description of the Prior Art

The development of a "HEADS-UP" display and which hereinafter will be referred to as HUD, had its genesis in the military aircraft field. As should be understood, in the operation of high speed aircraft such as fixed wing and rotary wing attack aircraft which are designed for combat, it is extremely hazardous for the pilot or a crew member such as a weapons officer to momentarily divert their attention from a hostile target or other point of interest in the immediate vicinity of the aircraft to read the dials, gauges, instruments, warning indicators, etc. on the assorted instrument panels and other displays positioned in various locations in the cockpit area but normally positioned below the average line of sight of the observer.

Those skilled in the art have long recognized that a HUD would be quite useful in such dangerous sports as high-speed motor car racing and could perhaps be helpful in the day-to-day driving activities of average motorists.

In operation, a HUD allows an operator of a conveyance such as all manner of overland vehicles, boats, aircraft, motorcycles, etc. to view substantially within their line of sight, critical instrumentation displays, such as speed, fuel consumption, oil pressure, etc. without substantially diverting their vision and attention from an area immediately in front of the vehicle. Further, such devices may be utilized in other applications such as in ticket booths, bank teller windows, etc.

The prior art is replete with several examples of HUDs which are designed for specific purposes and applications. Examples of prior art HUDs and related assemblies are shown in several U.S. patents, particularly Steward U.S. Pat. No. 4,652,870: Banbury U.S. Pat. No. 4,560,233: Spooner U.S. Pat. No. 4,347,508: and Garner U.S. Pat. No. 4,453,163, to name but a few.

While it is speculated that the utilization of a HUD could conceivably improve the safe operation of a motor vehicle, the prior art devices have not been widely embraced for such an application. This has been due, in large measure, to the physical size and complexity of these prior art devices and their related assemblies. Further, commercial embodiments of HUDs installed in recently manufactured motor vehicles have revealed numerous inherent shortcomings which have detracted from their usefulness.

For example, one major drawback of the most recently manufactured HUDs is that the purchase price for same is usually cost prohibitive for most purchasers.

Further, these devices do not operate effectively in many commonly encountered operational environments. By way of illustration, the commercially available HUDs individually employ digital, vacuum fluorescent displays, the light of which is reflected in an adjacent windscreen and which may be viewed by an operator. In one of the commercial embodiments, a windscreen viewing enhancement device is located somewhat out of the line of sight of the operator and which is adapted to reflect the light emitted by the display. Further, the other commercial embodiment employs, in combination with the digital vacuum fluorescent display, several optically precise mirrors which individually manipulate the light generated by the display in a predetermined fashion and projects it onto the adjacent windscreen. While these devices operate with some degree of success, they become inoperable in extremely bright light, or are difficult to read when the vehicle moves from a brightly lit environment into a shaded area.

Still another problem encountered with the prior art HUDs which have been designed for use in motor vehicles is the propensity for such devices to exhibit a characteristic inability to cooperate with other assemblies which are mounted in the area of the dashboard. Further, and with respect to one of the commercially available HUDs, the operator's eyes must be positioned within a very narrow cone of vision. If the operator moves his head outside of this cone, he will not be able to see the display. In addition, the prior art devices are not aesthetically appealing and therefore detract from the stylish appearance of the vehicle upon which it is installed.

Therefore, it has long been known that it would be desirable to have an instrument display apparatus which could be employed in all manner of overland vehicles, watercraft or aircraft, which could be manufactured and purchased at a relatively nominal cost, which is both highly efficient in operation and capable of operating in environments having various ambient light levels for the purpose of displaying an instrument face on an adjacent windscreen and within the line of vision of the operator, and which reduces to an absolute minimum the assorted problems inherent with the related prior art devices adapted to perform the identical function.

OBJECTS AND SUMMARY OF THE INVENTION

It is therefore an object of the present invention to provide an improved instrument display apparatus.

Another object of the present invention is to provide such an apparatus which can be directly controlled, either manually, or automatically, under all types of ambient lighting conditions to provide an image which is clear and distinct.

Another object of the present invention is to provide an apparatus which may be manufactured as an integral component of a vehicle or which further can be manufactured in the manner of a retrofit.

Another object of the present invention is to provide such an apparatus which fits easily into existing vehicle dashboard designs.

Another object of the present invention is to provide an apparatus which absorbs or otherwise substantially blocks light waves which would otherwise create an undesirable optical effect.

Another object of the present invention is to provide an apparatus wherein the display face emits light waves in a peak frequency range which is substantially attenuated by the windscreen.

Another object of the present invention is to provide an apparatus which operates in combination with windscreens having various angular inclinations, and which further is not rendered inoperable by external interference such as bright sunlight, the bright lights of oncoming vehicles, or other conditions which may drastically alter the ambient background lighting environment.

Another object of the present invention is to provide an apparatus which is characterized by ease of installation, simplicity of construction, and which further can be sold at a relatively nominal price when compared with related prior art devices.

Another object of the present invention is to provide an apparatus which is easily accessible for maintenance, modification or the like.

Another object of the present invention is to provide an apparatus which is operable to obtain the individual benefits to be derived from related prior art devices while avoiding the detriments individually associated therewith.

Further objects and advantages are to provide improved elements and arrangements thereof in an instrument display apparatus for the purposes described which is dependable, economical, durable, and fully effective in accomplishing its intended purposes.

These and other objects and advantages are achieved in an instrument display apparatus for use in combination with a substantially transparent panel and wherein in the preferred embodiment the apparatus includes an instrument to be displayed positioned adjacent to the transparent panel and having a display face including a first portion which is translucent and light reflective and a second portion surrounding the first portion and which provides contrast for the first portion, and wherein the first portion is adapted to reflect ambient light onto the substantially transparent panel; and means for selectively supplying light to the first portion whereby the first portion may be viewed in the substantially transparent panel regardless of the level of ambient light.

BRIEF DESCRIPTION OF THE DRAWINGS

FIG. 2 is a rear elevation view of an operator's position of a vehicle employing the first and second forms of the apparatus of the present invention.

FIGS. 3A-3C are a schematic, longitudinal, sectional view of several windscreens having predetermined tint fields of various characteristics, and taken from a position along line 3—3 of FIG. 1 and FIG. 12, respectively.

DESCRIPTION OF THE PREFERRED EMBODIMENT

First Form

Figure 1:
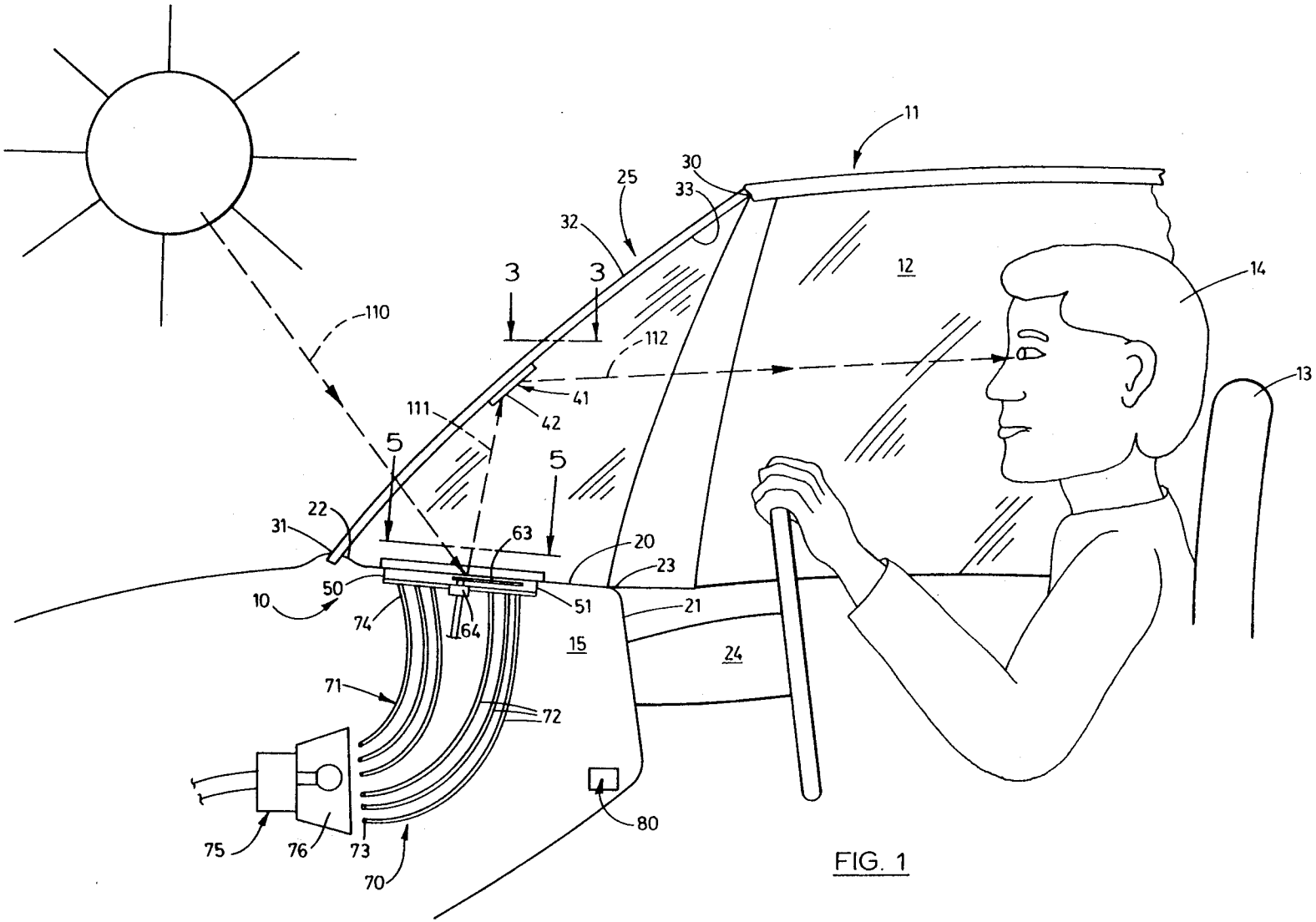
FIG. 1 is a fragmentary, longitudinal, side elevation view of an operator's position of a vehicle employing the first form of the apparatus of the subject invention.

Referring more particularly to the drawings, the first form of the apparatus embodying the principles of the present invention is designated generally by the numeral 10 in FIG. 1. As depicted therein, the apparatus is shown mounted in a vehicle 11 and which includes an operator's compartment or position 12. The operator's position has a seat 13 for an operator 14. The vehicle includes a console or dashboard 15 which has a top surface 20 and which is defined by a peripheral edge 21. The peripheral edge of the dashboard includes a leading peripheral edge 22 and a trailing peripheral edge 23. Further, the vehicle includes a steering wheel 24, and a windscreen 25 is borne by the vehicle and is mounted adjacent to and in angulated, spaced relationship with the dashboard 15.

The windscreen 25 is defined by top and bottom peripheral edges 30 and 31, respectively, and further includes an outside surface 32 and an opposite, inside surface 33. The windshield is of traditional design that is, it may be manufactured of glass, plastic, polycarbonate, acrylic, crystal or mineral, or any other rigid transparent material. As illustrated herein, the windscreen is a piece of safety glass having first and second laminate portions 34 and 35, respectively, and which are bonded together, and which include a synthetic polymer sheet 40 which is sandwiched between the first and second laminate portions. As earlier discussed, the present invention can be utilized in all manner of overland vehicles, aircraft and water borne conveyances. Further, such devices may also be utilized in connection with bank teller's windows, control areas, ticket selling booths, and other similar environments where a transparent panel is positioned between an operator or observer and an object of interest which must be observed.

Figure 12:
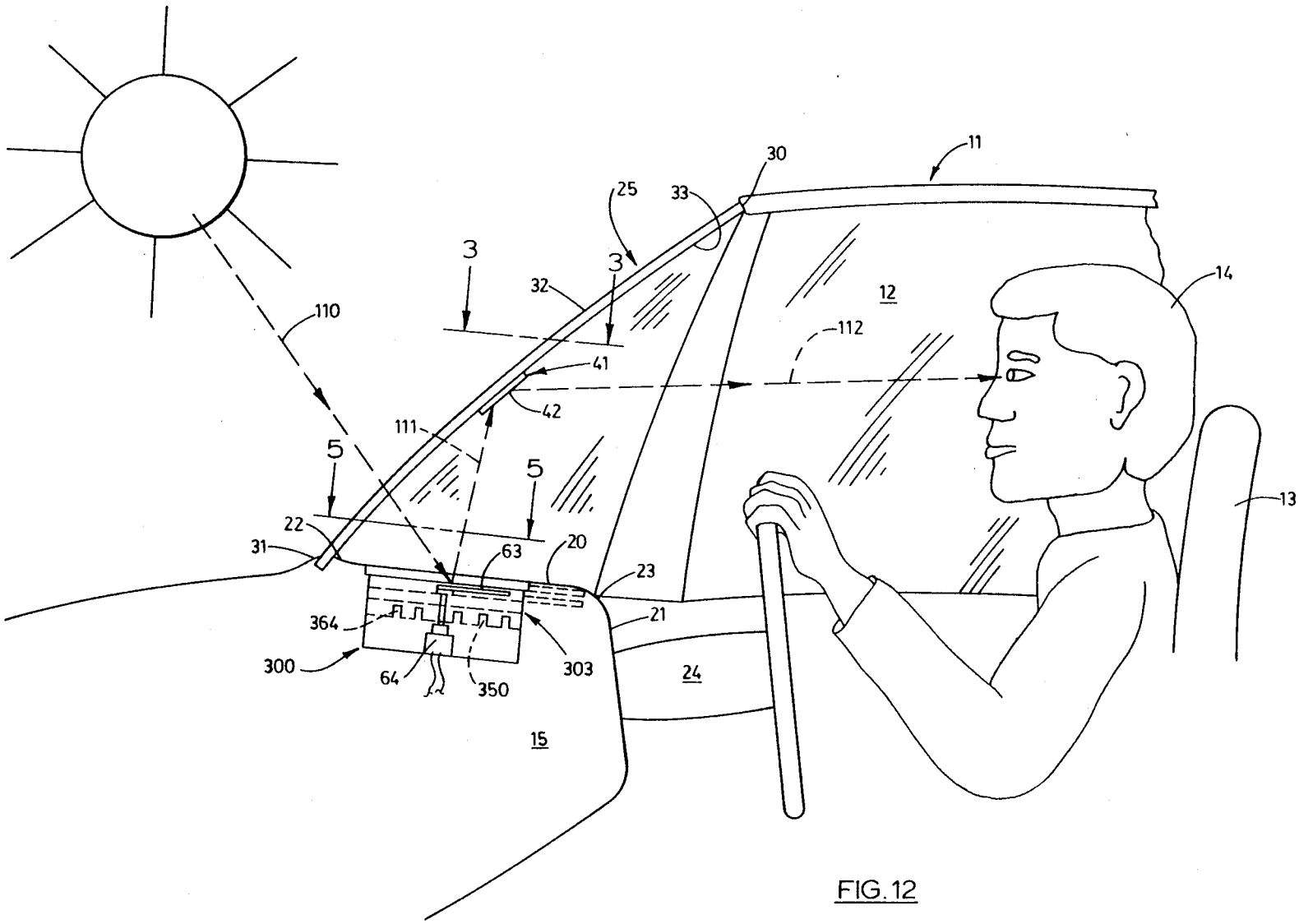
FIG. 12 is a fragmentary, longitudinal, side elevation view of an operator's position of a vehicle employing the second form of the apparatus of the subject invention.

As best understood by reference to FIGS. 2 and 3 the apparatus of the subject invention includes a predetermined tint field 41 which is borne by the windscreen and which is positioned substantially within the line of sight of the operator 14 who is positioned in the operator's position 12. The predetermined tint field, as illustrated, may include a discreetly dimensioned area as shown in FIGS. 1, 2, and 12 or may include the entire surface area of the windscreen 25. As best understood by a study of FIG. 3, the tint field 41 may be created by a number of different materials or substances, including all manner of different polymers, glass, mineral or other coatings. The coatings may further include metallic additives which may be applied in molten form, solution, rolling adhesive or other means of attachment either directly to the inside surface 33 of the windscreen 25 or made integral with the synthetic polymer sheet 40 which is sandwiched between the first and second laminate portions 34 and 35, respectively, of the windscreen 25. As illustrated most clearly in FIG. 3, the predetermined tint field 41 is shown, in Example A, as including a synthetic polymer sheet 42 which is secured to the inside surface 33 of the windscreen 25. An acceptable synthetic polymer sheet is commercially available and may be purchased under the brand name "LLumar window film." The film is manufactured by Martin Processing Inc. Further, and as shown in Example B of FIG. 3, the predetermined tint field is made integral, as by a coating 43, or the like, with the synthetic polymer sheet 40 which is sandwiched between the first and second laminate portions 34 and 35. Additionally, and as best seen in Example C of FIG. 3, the predetermined tint field may be created by a dispersion of particulate matter, or other substances, which are made integral with the second laminate portion of the windscreen and which define the predetermined tint field.

The predetermined tint field 41 imparts to the windscreen 25 improved spectral and other optical characteristics which improve the quality of the reflected image which is produced by the apparatus 10. More particularly, the tint field has a color which is adapted substantially to absorb or attenuate the frequency of light reflected or emitted by the display face. The display will be discussed in the paragraphs which follow. Further, the tint field is operable to eliminate or substantially reduce an undesirable optical effect which will hereinafter be discussed as a secondary or "ghost" image and further improves the intensity and color contrast relative to the ambient background illumination without violating standards for visible light transmission through the windscreen as mandated by the requirements of law. The optical effect which creates ghost images and the diminution of its overall deleterious effects on the operation of the present invention will be discussed in greater detail in the paragraphs which follow.

As best illustrated by reference to FIG. 1, an aperture of predetermined dimensions 50, is formed in the console 15 and is adapted to receive a supporting frame or housing 51 which encloses and surmounts an analog speedometer instrument display and which is generally indicated by the numeral 52. The analog display 52 has a top surface 53, an opposite bottom surface 54 and an aperture 55 of predetermined dimensions is formed therein. As best illustrated by reference to FIG. 5, the top surface 53 of the analog display 52, includes a display face having a plurality of reverse printed, translucent characters which are individually indicated by the numeral 60. Further, a pair of directional signalling characters, and an engine malfunction character, 61 and 62 respectively are displayed thereon. As should be understood, the directional signalling characters as well as the engine malfunction character are translucent. However, they further include a "dead front" which substantially inhibits them from reflecting ambient natural light which comes in through the windscreen. The significance of this feature will be hereinafter discussed in greater detail. Further, the remainder of the display face surrounding the translucent characters has a flat black color which provides a high contrast background for the translucent characters. It should be understood that the display face, in certain applications, may be manufactured in a manner wherein the individual reverse printed characters 60 are printed in a fashion wherein they are opaque and nonreflective, and the remainder of the display face is rendered translucent and reflective. In this fashion the translucent, bright background provides high contrast for the dark nonreflective characters.

Figure 5:
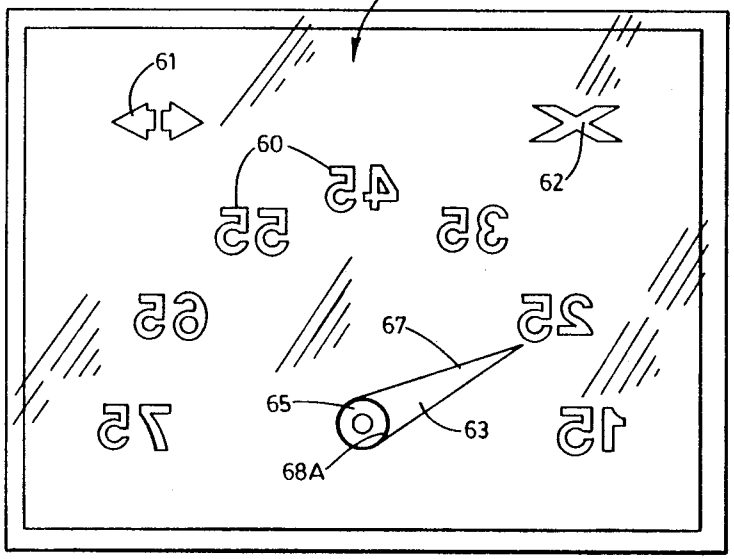
FIG. 5 is a plan view of the first and second forms of the apparatus of the subject invention taken from a position along line 5—5 of FIG. 1 and FIG. 12, respectively.

The translucent characters 60 are positioned in a predetermined pattern as best illustrated by reference to FIG. 5. As should be understood, the inventor has discovered that by adjusting the size of the characters the apparent effect of the secondary or "ghost image" can be minimized thereby making the reflected image quite readable. In this regard, the inventor has discovered that as the size of the characters increase the visual impact or effect of the ghost image decreases and similarly, as the focal length increases, that is, the distance from the operator 14 to the windscreen 25, the apparent effect of the ghost image decreases. In practice, the inventor has found it useful to form the characters in a manner wherein they have respective overall length dimensions which are approximately 10 mm and width dimensions, for the lines forming the characters, of approximately 2.7–3 mm.

Figure 10:
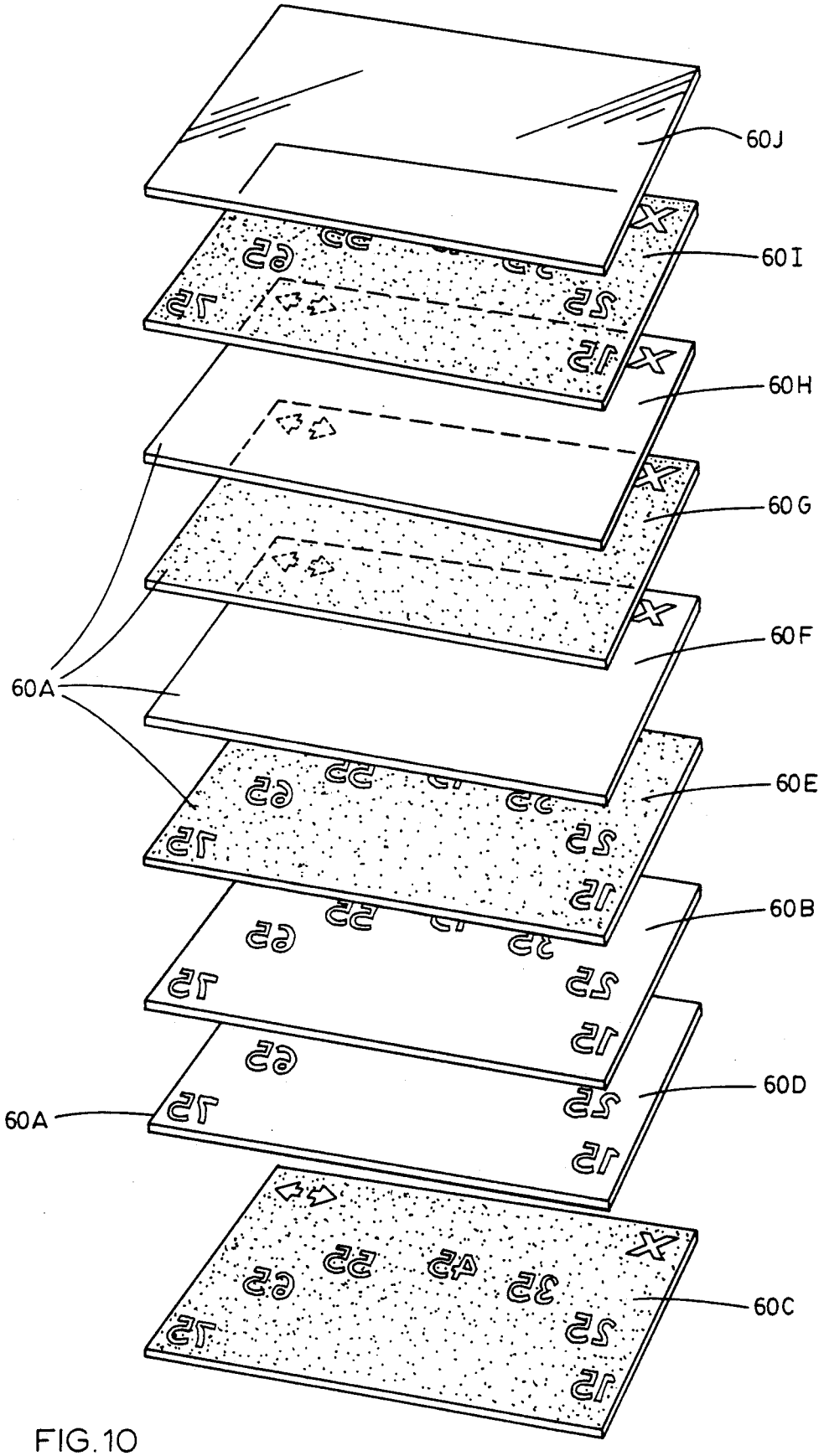
FIG. 10 is an exploded view of a reverse printed character of the present invention and showing various layers of the character.

As best illustrated by reference to FIG. 10, an analog display 52 is shown in an exploded fashion and which illustrates in greatly exaggerated dimensions the various layers of paint or ink 60A which are utilized in preparing such an analog display on a polycarbonate substrate 60B which has an approximate thickness of 0.060 inch. Layers of flat black paint or ink 60C and white paint or ink 60D are applied to the bottom surface thereof. As illustrated, the flat black paint prevents "light leakage" from below. Further and on top of the polycarbonate substrate the following layers are applied in sequence. Layer 60E includes paint or ink which emits light in the frequency of light selected. This is utilized for the characters 60, for example. In addition, a diffuser layer 60F, and a translucent red/orange layer 60G are utilized for the directional signaling characters and the engine malfunction character 61 and 62, respectively. A dead front layer 60H is applied and is adapted to inhibit reflection of light off of the directional signaling characters and the engine malfunction character. Another layer of flat black paint or ink 60I is applied and which provides contrast for the characters. Finally, an antiscratch, hard, clear, synthetic coat 60J is applied to complete the process.

A movable indicator needle 63 is rotatably mounted on the analog display 52 by a coiled spring return meter movement 64 which is fixed on the bottom surface 54 of the analog display by using suitable fasteners or adhesive (not shown). The coiled spring return meter movement is of conventional design and therefore, for the sake of brevity, is not discussed in further detail herein. However, it should be understood that the coiled spring return meter movement is operable selectively to position the indicator needle in predetermined locations along the analog display 52 thereby indicating the overland speed of the vehicle. The coiled spring return meter movement is adapted to rotatably move the indicator needle in a counterclockwise direction, that is, in a direction whereby its reflected image appears to move in a proper direction when viewed from the operators position 12. This direction of movement is generally opposite to the traditional direction of movement of an indicator needle. This counterclockwise rotation is achieved by means of an electronic circuit which selectively delivers predetermined amounts of voltage to the coiled spring return meter movement which varies linearly and inversely relative to the vehicle speed. The operation of three embodiments of this electronic circuit will be discussed in greater detail hereinafter. Alternatively, the coiled spring return meter movement may be mechanically modified such that it will operate in an appropriate fashion, that is, drive the indicator needle in a counterclockwise direction by utilizing an electronic circuit which will be discussed in greater detail hereinafter. The coiled spring return meter movement is mechanically modified by reversing the position of the spring and modifying other subassemblies. Further, a device such as a stepping motor may be utilized to perform the identical function.

Figure 9:
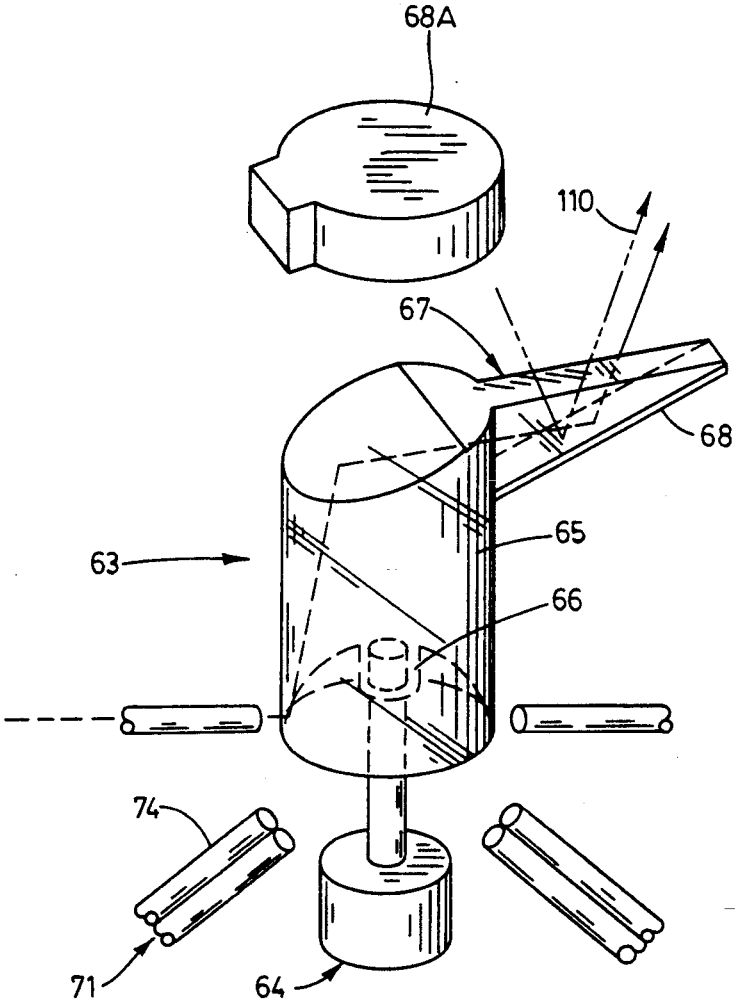
FIG. 9 is a fragmentary, longitudinal, side elevation view of an indicator needle of the present invention.

As best illustrated by reference to FIG. 9, the indicator needle 63 which is utilized in both the first and second forms of the invention includes a substantially cylindrically shaped and vertically disposed barrel 65 which is manufactured from a suitable light transmitting acrylic material. The main barrel is attached to the coiled spring meter movement 64 at attachment point 66 such that it rotates simultaneously with the meter movement 64. The barrel 65 mounts an acrylic pointer assembly 67 which extends radially outwardly relative to the barrel and which is adapted to receive light discharged from a light manifold and which is reflected in the barrel and down the pointer assembly. The light manifold will be discussed in the paragraphs which follow. The pointer assembly has a bottom surface 68 which is angulated such that light reflected down the pointer assembly is reflected off of this surface and towards the windscreen 25. The bottom surface is coated with material which reflects light which lies in a peak frequency band which is attenuated by the tint field 41. Similarly, the bottom surface is adapted to receive and reflect ambient natural light 110 which comes in through the windscreen 25. A black cover 68 is borne by the barrel 65 in the manner shown in FIG. 9.

A dust cover 69 is borne by the housing and includes a substantially flat, transparent panel of coated and/or tempered glass, or other similar substances and which is adapted to prevent dust, moisture, etc. from interfering with the coiled spring return meter movement. The dust cover, and more particularly, the coating includes a high efficiency anti-reflection coating (HEA) which is produced by Optical Coating Laboratories, Inc. of Santa Rosa, Calif., and which is adapted to increase the clarity of the glass and minimizes reflections. This reduces the impact of glare upon the operator 14. Another means by which problems related to glare can be addressed is by using technique called "geometric avoidance." This process includes analyzing the vehicle in such a manner as to identify possible glare paths and thereafter designing a dust cover with two or possibly three critical dimensions which, when optimally placed, inhibits any glare from reaching the operators eyes.

An auxiliary lighting assembly, and which is generally indicated by the numeral 70, is borne by the vehicle 11 and includes a light manifold 71. The light manifold is made up of a plurality of Polymethyl Methacrylate bundles having fluorinated polymer cladding. A suitable optical fiber 72 is manufactured by Mitsubishi Rayon under the "Eska" brand name. Each of the optical fibers 72 has an input end 73 and an opposite output end 74 which is fixed to the bottom surface 54 by utilizing a suitable adhesive such as an epoxy or other resin, or which is ultrasonically welded, spin welded or molded such that it is properly fixed to or disposed in adjacent spaced relation to the back surface of the display face. The output ends 74 are positioned in light emitting relation relative to the individual translucent characters 60, the directional signaling characters and engine malfunction characters 61 and 62, respectively, and the barrel 65. The input ends 73 of the individual optical fibers are positioned in substantially light receiving relation relative to a high intensity light source 75. This high intensity light source 75 may include a Tungsten halogen lamp such as that manufactured by the General Electric Company under the brand name "Precise" MR-16 VNSP Tungsten Halogen Lamp. The lamp includes a reflector 76 which focuses the light on the input ends of the optical fibers. Further, the apparatus may be constructed in such a fashion wherein a light manifold is not utilized and a light source is merely positioned in light transmitting relation relative to the bottom surface 54. This type of construction will be discussed in greater detail with respect to the second form of the invention. In addition, a shutter assembly, not shown, may be mounted on the output ends of the optical fibers 72 which deliver light to the signaling characters and engine malfunction character respectively thereby preventing these characters from appearing in the windscreen except under signaling conditions. A shutter assembly as just described could also be mounted on the bottom surface 54 in the event the apparatus 10 does not utilize a light manifold.

An electronic circuit for selectively activating the auxiliary lighting assembly 70 is generally indicated by the numeral 79. A switching assembly 80 is borne by the dashboard 15 and further is connected to a source of 12 volt power 81 which is produced by the vehicle 11. The switching assembly 80 includes a ground 82, and a pair of electrical conductors 83 electrically connect the ground and the source of 12 volt power 81 with a 5K ohm variable resistor or potentiometer 84. A manually actuatable switch 85 selectively is movable by utilizing a wheel-like assembly, not shown, from an open to a closed position. A pair of electrical leads 90 electrically connect the switch 85 and the 5K ohm potentiometer 84 to a voltage regulator 91. The voltage regulator 91 is manufactured by Motorola under the trade designation "LM350" and which is commercially available through retail electronic shops. The voltage regulator 91 includes terminals which are labeled "input", "Adj" and "output", 92, 93 and 94 respectively. A photosensor 95, a fixed resistor 100 having a value of 270 ohms, a capacitor 101 having a value of substantially 54 microfarads and a ground 102 are electrically connected together by an electrical conductor 103. An electrical conductor 104 electrically connects the output 94 and the high intensity Halogen light source 75 with the ground 102.

Figure 4:
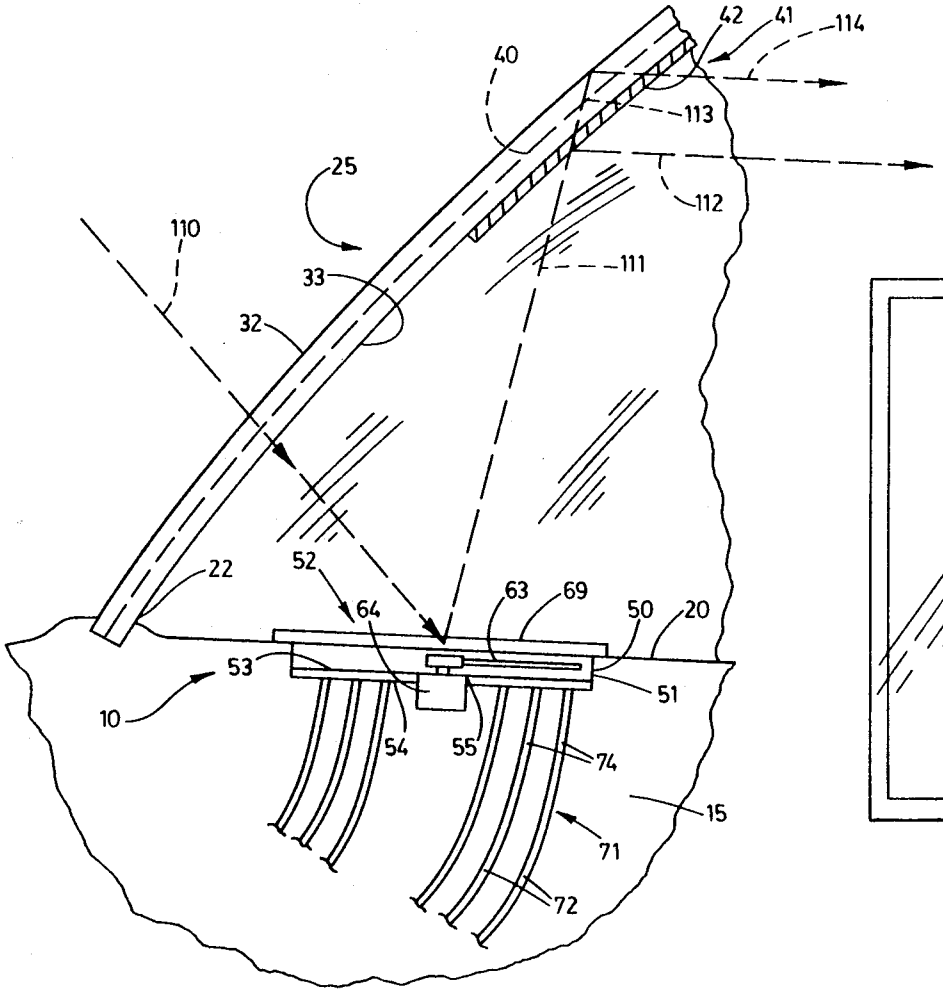
FIG. 4 is a somewhat enlarged, longitudinal, sectional view of a windscreen taken from a position along line 3—3 of FIG. 1 and FIG. 12 and illustrating the optical effect which creates a "ghost" of a primary reflected image.
Figure 6:
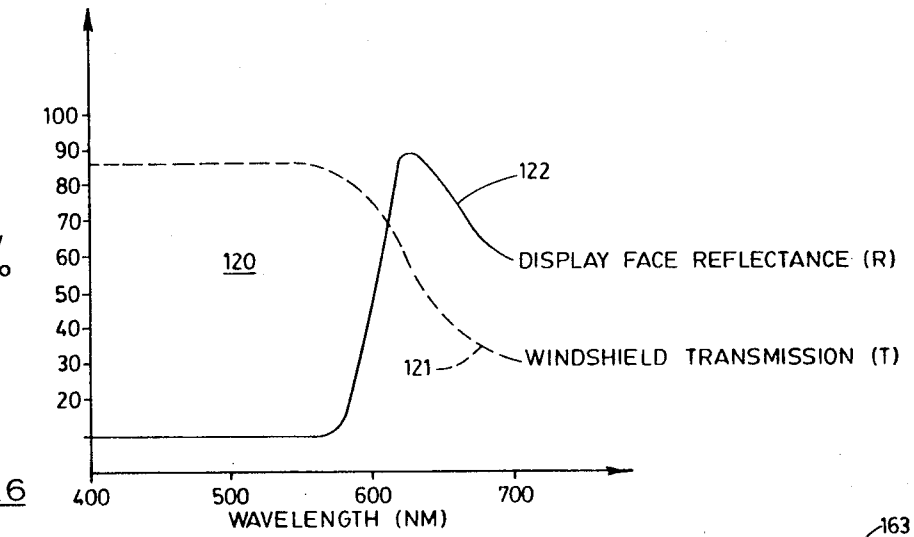
FIG. 6 is a graphic depiction of the light wave transmission and absorbing features of a windscreen employing a tint field in accordance with the teachings of the present invention.
Figure 7:
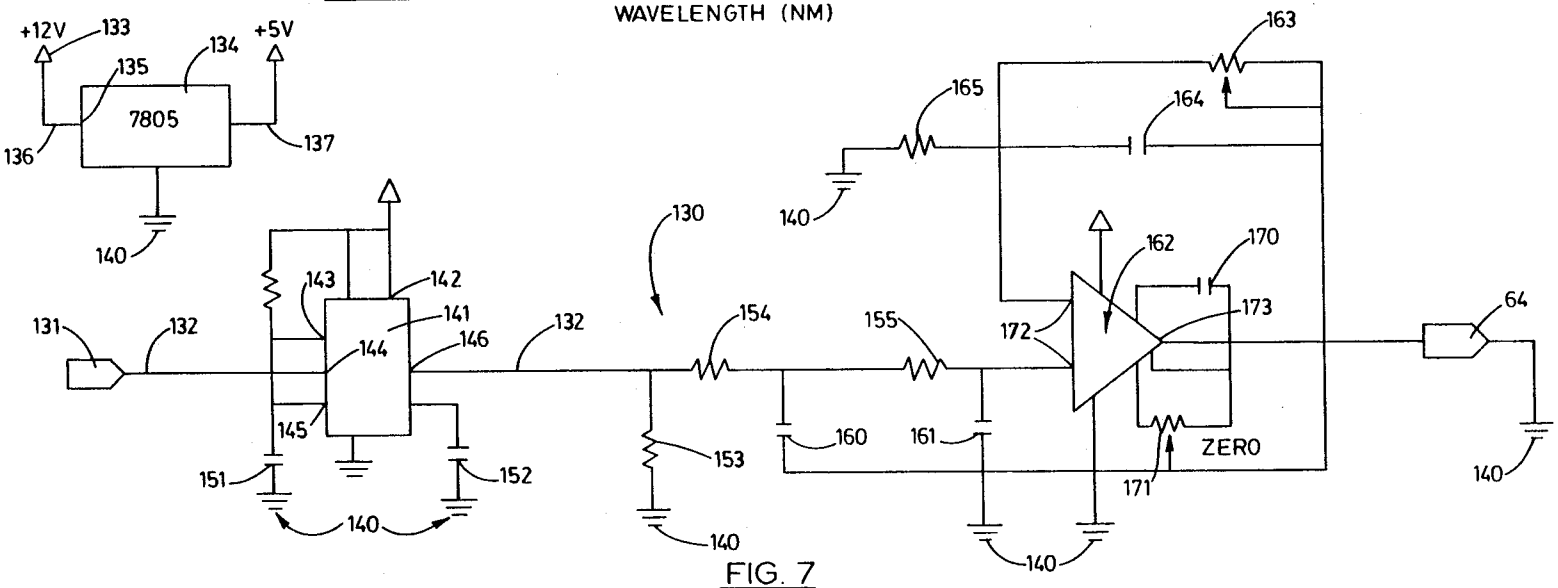
FIG. 7 is a schematic diagram of a first electronic circuit employed in connection with the present invention.
Figure 8:
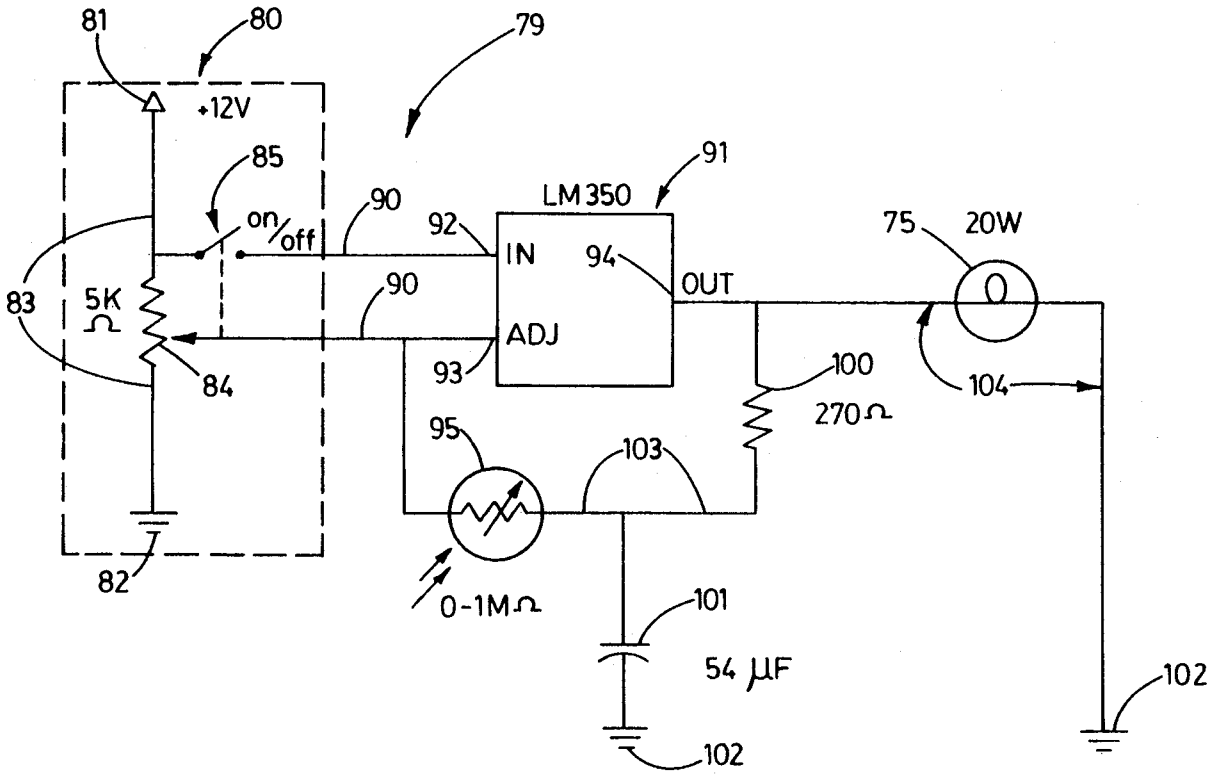
FIG. 8 is a schematic diagram of a second electronic circuit employed in connection with the present invention.

As earlier discussed, the tint field 41 is operable to eliminate or substantially reduce an undesirable optical effect which has been termed a secondary or "ghost image". The ghost image has the effect of producing a double-image which blurs or clutters the primary reflected image such that the primary image is difficult to view. By way of illustration, and as best seen by reference to FIG. 4, incoming rays of natural light 110 are shown as passing through the windscreen 25 and being reflected off of the top surface 53 of the analog display 52. The reflected light, which travels along a first path 111, passes through the predetermined tint field 41 and a portion of this reflected light is then reflected off of the inside surface 33. These reflected light waves form the primary reflection which appears in the tint field, the reflected light waves travelling along a second path 112 towards the observer 14. Those nonreflected light waves continue to pass through the second laminate portion 35 of the windscreen 25 and along a third path 113. The nonreflected light waves travel along the third path 113 until they are reflected off of the outside surface 32 of the windscreen 25 and travel along a fourth path 114 back towards the observer 14 to create the ghost image. However, the tint field acts upon the light traveling along the fourth path such that these light waves are absorbed or attenuated such that any ghost image is barely perceptible. In addition to the foregoing, federal law mandates that windscreens be designed to transmit at least 70% of the visible light spectrum. In order to comply with the provisions of law, the tint field has been designed to substantially and selectively attenuate or absorb only those wavelengths of light reflected or emitted by the analog display 52. More particularly, it has been discovered that upon achieving the selective transmission or reflection of light in predetermined frequencies, the tint field can be adapted to attenuate just those frequencies which lie in a peak frequency band such that the average visible spectrum transmission of the windshield is not reduced below the 70% requirement as mandated by federal law. In the present invention, the applicants have selected a color for the reverse printed translucent characters 60 which reflects or emits light waves which reside predominantly in a peak frequency band of 625 through 700 nanometers. In accordance with these teachings, the tint field 41 is adapted to absorb a high percentage of light produced in this particular peak band without excessively reducing the visible spectrum transmission average. While the windscreen 25 transmission in the 625 through 700 nanometer band is less than 50%, the visible spectrum average transmission is over 70%, which permits the windscreen to meet federal standards. By way of example, and more particularly by reference to FIG. 6, a graphic illustration 120 shows a line 121 which indicates windscreen light transmission as compared with the wavelength of the light for a windscreen utilizing a tint field 41 which is adapted to attenuate light in the 625 to 700 nanometer band. Further, the display face reflectance is indicated by the line labeled 122. This graphic illustration shows that an overall 70% light transmission requirement can be achieved by such selective attenuation.

It has been discovered that the substantial matching of the peak reflected frequencies of light produced by the translucent characters 60 to the minimum light transmission characteristics of the tint field 41 presents a three-fold benefit. The primary benefit is directed to reducing substantially the intensity of the secondary or ghost image. This effect is achieved because the light passing through the windscreen 25 and which causes the ghost image passes through the tint field 41 on two occasions. On each occasion, the ghost image is weakened to such an extent that it becomes barely perceptible in relative comparison to the primary image by the time it emerges in the operator's 14 line of sight. Further, and in addition to the foregoing, a secondary benefit of the tint field is to increase the image's contrast relative to the ambient background light by reducing the amount of in-band light, which is readily apparent in the background. In the present instance, the inventors have selected a color for the translucent characters 60, which lies in the red-orange band. However, this same concept can be applied to virtually any color band such that the reflected image may appear yellow, green, blue, orange or pure red. As should be understood, the present color was selected because of its contrast with those colors which are quite common in the immediate environment. A third benefit is achieved because the tint field 41 creates a point of interest which the operator 14 may look to when receiving information produced by the analog display 52.

It should be understood that the individual characters 60 operate as diffuse reflectors and which further are operable to transmit light received from the individual acrylic optical fibers and direct same towards the windscreen 25. In the preferred embodiment and as earlier discussed, the analog display 52 is manufactured from approximate 0.060 inch thick polycarbonate 60B which has applied thereto paint or ink which will act in the manner as heretofore disclosed. The selection of an appropriate paint or ink will normally include an analysis utilizing a spectragraph to determine the frequency of light reflected and thereafter an appropriate tint will be selected which will substantially attenuate the frequencies of light reflected. In practice, the thickness of the paint deposited on the polycarbonate will depend upon various factors including the light intensity as delivered by the light manifold as well as the application involved. However, it will be recognized that an increase in reflectivity of a character 60 will cause a decrease in its ability to transmit light received from an optical cable. In the present invention, the inventors have found it advisable to print the individual characters in the manner which is shown in FIG. 10 and which was discussed earlier.

A first embodiment of an electronic circuit 130 for controlling the coiled spring return meter movement 64 is operable to actuate the meter movement 64 to rotatably move the indicator needle 63 in a counterclockwise direction such that the reflection of the indicator needle appears to move in a proper direction when viewed from the operators position 12. By way of introduction, it should be understood that vehicle 11 is operable to produce an electronic pulse 131 which indicates the overland speed of the vehicle. The inventors have, for experimentation, utilized the electronic pulsed signals transmitted to a digital speedometer display which was installed on a 1989 Cutlass Supreme automobile. The electronic circuit 130 includes a multiplicity of electrical conductors 132. The vehicle 11 also includes a source of 12 volt power 133 which may be supplied by the vehicle's battery (not shown). The source of 12 volt power is supplied to a voltage regulator 134, which will hereinafter be referred to as a 7805 semiconductor chip (7805 IC) and which is commercially available through retail electronic stores nationwide. The 7805 IC 134 has an input 135, and an electrical conductor 136 electrically connects the source of 12 volt power with the 7805 IC. Further, the 7805 IC is operable to produce a substantially constant 5 volt output 137 which is supplied to the electronic circuit 130, as will hereinafter be described in further detail. The ground for the above-identified electronic circuit 130 is generally indicated by the numeral 140. The electronic circuit 130 includes a signal processor means which is indicated by the numeral 141 and which may be purchased in retail electronic outlets nationwide as a 555 integrated chip (555 IC), which is used as a monostable. The 555 IC 141 is adapted to process the electrical pulses 131 which are received from the vehicle 11 and produce substantially uniform electrical pulses having a magnitude or amplitude of not greater than 5 volts and a predetermined duration period. The 555 IC receives 5 volts of power from the 7805 IC. The 555 IC further includes a plurality of pins which are connected to the electrical conductors 132. These pins include a V+ pin 142, a threshold pin 143, a trigger pin 144, a DIS pin 145, an output pin 146, a reset pin 147, and a V/C pin 148.

A 5M ohm resistor 150 is electrically connected with the 555 IC 141. Further, a 1500 pF capacitor 151 and a 0.01 microfarad capacitor 152 are electrically connected to the 555 IC 141. A 3.9K ohm resistor 153 is electrically connected between the ground 140 and the electronic circuit 130. Further, first and second resistors having values of 10M ohm are serially connected to the electronic circuit 130 and are designated by the numerals 154 and 155, respectively. The electronic circuit 130 further includes first and second resistors 160 and 161 having values of 1500 pF and an operational amplifier 162, which is commercially available and designated as a 3130 integrated chip (3130 IC) and which is adapted to receive the processed signals produced by the 555 IC 141. The 3130 IC further operators as a two pole low band pass filter. The 3130 IC is commercially available through retail electrical supply stores nationwide. Electrically connected to the operational amplifier (3130 IC) is a 100K ohm potentiometer or variable resistor 163. The 100k ohm variable resistor 163 is adapted to set the maximum output voltage for the operational amplifier 162 which in the case of the analog speedometer display 52 is approximately 1.4 volts. The 100k ohm potentiometer comprises one portion of a calibration means whereby the coil spring return meter movement 64 is operable to move the indicator needle 63 to selective locations along the display face 52, and which correctly indicates the overland speed of the vehicle 11. The electronic circuit 130 includes a capacitor 164 having a value of 47 pF and a resistor having a value of 100K ohms 165. In addition, a 47 pF capacitor 170 is electrically connected to a second 100K ohm potentiometer or variable resistor 171. The second potentiometer constitutes a second portion of the calibration means which is adapted to set the minimum voltage output for the operational amplifier 162. In the present case, the minimum voltage lies in a range of approximately 0–0.3 volts. The operational amplifier includes inputs which are generally designated by the numeral 172 and an output 173. As should be understood, the electronic circuit 130 is adapted to receive and process the electrical pulses 131 produced by the vehicle 11 into a source of voltage for actuating the coil spring return meter movement 64 which varies linearly and inversely relative to the rate of electronic pulsing. Therefore, as the speed of the vehicle increases, the voltage output of the operational amplifier decreases. Conversely, when the vehicle speed decreases the voltage output increases, thereby causing the coiled spring return meter movement to move the needle in a proper direction when it is viewed in reflection from the operator's position. As earlier discussed, the coil spring return meter movement may be mechanically altered to achieve the desired affect. An electronic circuit for actuating a mechanically modified coiled spring return meter movement will be described in greater detail hereinafter and in connection with the second form of the invention. Further, no modifications may be necessary in certain applications.

A second embodiment of an electronic circuit 180 for controlling the coiled spring return meter movement 64 is also operable to actuate the coiled spring return meter movement 64 such that it rotatably moves the indicator needle 63 in a counterclockwise direction such that the reflection of the indicator needle appearing in the windscreen appears to move in a proper direction when viewed from the operators position 12. The electronic circuit 180 includes in addition to several electronic components which were earlier discussed, a plurality of electrical conductors 181. Further, the electronic circuit 180 receives the electronic pulses 131, which indicates the overland speed of the vehicle 11 at a location in the vehicle 11 that is designated as A9. The electronic circuit receives a source of 12 volt power 133 through electrical conductor 90 and which is supplied by the vehicle's battery (not shown), and which may be accessed in the vehicle at a location which is designated A4. The source of 12 volt power is supplied to the voltage regulator 134 and which was described earlier as a 7805 semiconductor chip (7805 IC) and which is commercially available through retail electronic stores nationwide. As earlier discussed, the 7805 IC supplies a substantially constant 5 volt output 137 which is supplied to the electronic circuit 180. The ground for the above-identified electronic circuit 180 is generally indicated by the numeral 140. The electronic circuit 180 includes a 0.01 microfarad capacitor 182 which is electrically joined to the source of electrical pulses produced by the vehicle A9 (131). Further, the electronic circuit 180 includes a 10K ohm resistor 183 and a pair of diodes 184 which are electrically connected together to form a differentiator or signal modifier means 185 which is adapted to modify the vehicle electrical pulses in a manner to form electrical pulses having a predetermined wave form and amplitude. As shown herein, the electrical pulses produced by the signal modifier means 185 have an amplitude of not greater than 5 volts.

Figure 11:
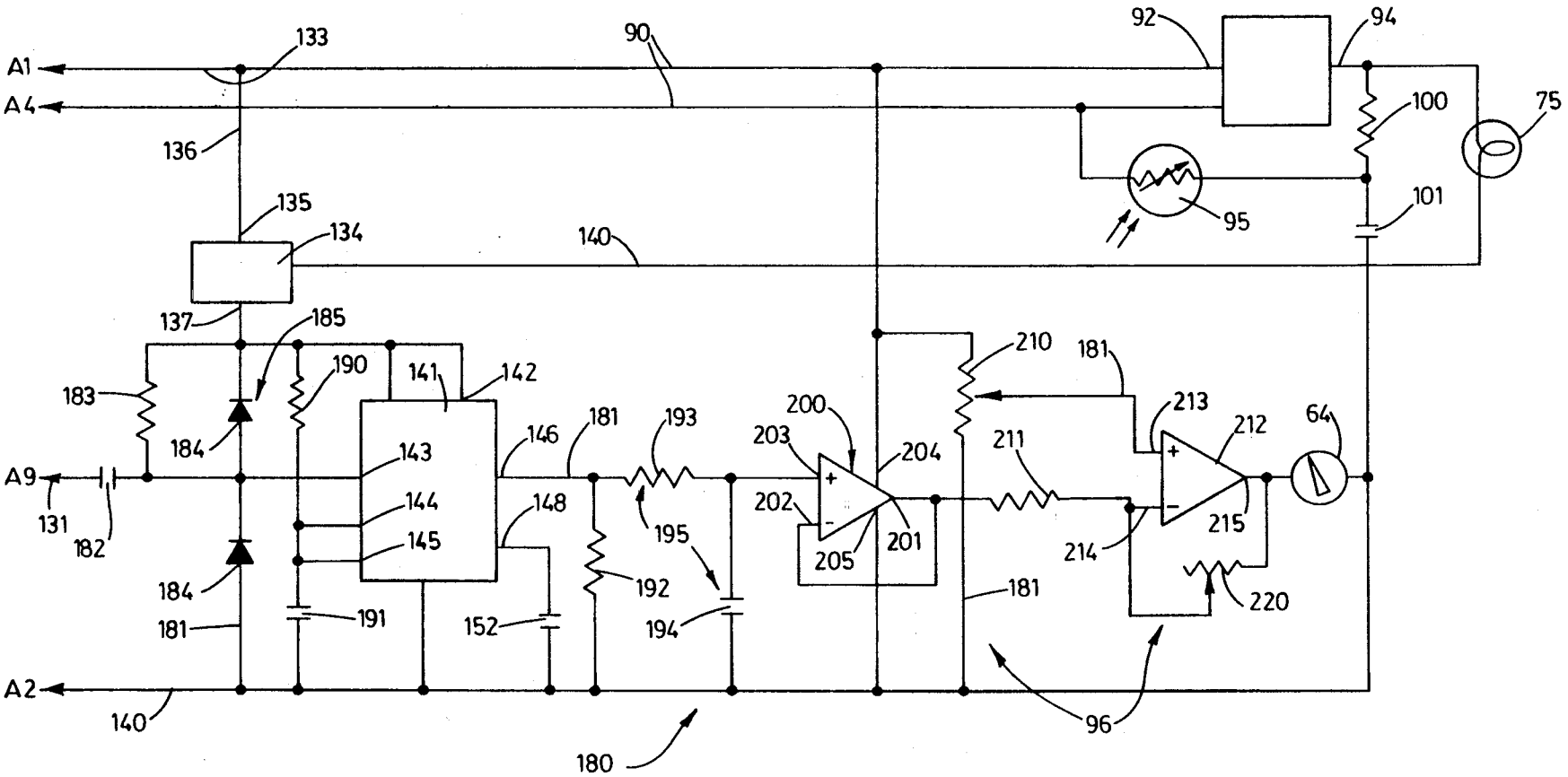
FIG. 11 is a schematic diagram of a third electronic circuit employed in connection with the present invention.

The electronic circuit 180 further includes a 100K ohm resistor 190 and a 0.1 microfarad capacitor 191 which are electrically connected to the 555 IC monostable 141 in the manner as best shown by reference to FIG. 11. Further, the electronic circuit 181 includes a 3.3K ohm resistor 192. The electronic circuit has a 100K ohm resistor 193 and a 2.2 microfarad capacitor 194 which comprise an integrator means which is generally indicated by the numeral 195, and which is adapted to receive the electrical pulses which have been processed by the 555 IC 141, and which forms an integrated voltage output. The electronic circuit 180 of the present invention includes a quad operational amplifier which is generally indicated by the numeral 196, and which is commercially available through retail electronic stores nationwide under the trade designation "LM324". In the present invention, the electronic circuit 180 utilizes only two of the four operational amplifiers available and therefore for simplicity, only those operational amplifiers are shown. The quad operational amplifier 196 includes a first operational amplifier which is generally indicated by the numeral 200 and which includes first, second, third and fourth pins 201 through 204, respectively. Pin 11 of the first operational amplifier is indicated by the number 205. As best illustrated by reference to FIG. 11, the first operational amplifier is electrically connected with the integrator means 195 and with the electrical power source 133 which is borne by the vehicle 11. Further, the first operational amplifier is adapted to produce a voltage output at pin 201 which is substantially linearly related to the pulse rate of the vehicle 11. A 100K ohm resistor 211 is electrically connected between the first operational amplifier and the second operational amplifier 212. The second operational amplifier 212 includes pins 12, 13 and 14 and which are designated by the numerals 213, 214 and 215, respectively. As best illustrated by reference to FIG. 11, the input for the second operational amplifier 214 is electrically connected with the output 201 of the first operational amplifier and the output 215 of the second operational amplifier is electrically connected to the return meter movement 64. The electronic circuit 180 includes means for calibrating the voltage output of the second operational amplifier. In the embodiment shown in FIG. 11, the calibration means includes first and second variable resistors 210 and 220, respectively, and which have individual resistance values of 100K ohms each. As should be understood, the first variable resistor 210 is operable to control the maximum voltage output for the second operational amplifier and the second variable resistor is adapted to control the minimum voltage output of the second operational amplifier. The maximum and minimum voltages were discussed earlier with respect to the first electronic circuit 130. The second electronic circuit 180 additionally includes the electrical circuit which was heretofore identified by the numeral 79 and which is adapted to selectively activate the Halogen lamp 75 in the manner which was previously described.

Second Form

The second form of the instrument display apparatus of the subject invention is generally indicated by the numeral 300 in FIG. 12. As illustrated therein, the apparatus is shown mounted on a vehicle 11 and which includes the operator's compartment or position 12. The operator's position has a seat 13 for an operator 14. The vehicle includes a console or dashboard 15 which has a top surface 20 and which is defined by a peripheral edge 21. The peripheral edge of the dashboard includes a leading peripheral edge 22 and a trailing peripheral edge 23. Further, the vehicle includes a steering wheel 24, and a windscreen 25 is borne by the vehicle and is mounted adjacent to, and in an angulated, spaced relationship with, the dashboard 15. The construction of the windscreen and the operation of the predetermined tint field 41 is substantially identical to that which was earlier discussed with respect to the first form of the invention and, therefore, are not discussed in further detail herein. The second form of the invention includes a housing 301 which is best illustrated by reference to FIG. 13 or in the alternative, a housing 302 which is shown in FIG. 14. The housing is mounted on or otherwise made integral with the dashboard using conventional fastening or manufacturing techniques. Each of the housings 301 or 302 has a main body 303 which may be manufactured out of assorted materials including various lightweight metals as well as synthetic polymers and other substances which may be extruded, stamped or otherwise molded into the desired shape by employing conventional manufacturing methods. The main body of each of the housings includes three sidewalls 304 and a front wall 305 which are respectively joined together or otherwise made integral to form a structure or container having a substantially rectangular shape. An opening 306 of predetermined dimensions is formed in one of the sidewalls and is adapted to provide a point of access which permits electric leads (not shown) to enter the housing. Alternatively the opening may be formed in the front wall, or in bottom surface 307. The housings further have a bottom surface 307 which is fixed to or made integral with the walls 304 and 305. The main bodies 303 of each of the housings have an outside surface 310 and an opposite, inside surface 311 as well as a top peripheral edge 312 and a bottom peripheral edge 313. As best illustrated by references to FIG. 13 and FIG. 14, the housings include a circumscribing flange 314 which is disposed in a substantially normal attitude relative to the outside surface 310 and which rests on or adjacent to the dashboard 15 when the housing is installed. Further an opening 315 is formed in front wall 305 and which permits an opaque cover to move from a stored position to a location wherein it covers the individual housings. The opaque cover and its operation will be discussed in greater detail in the paragraphs which follow.

Figure 13:
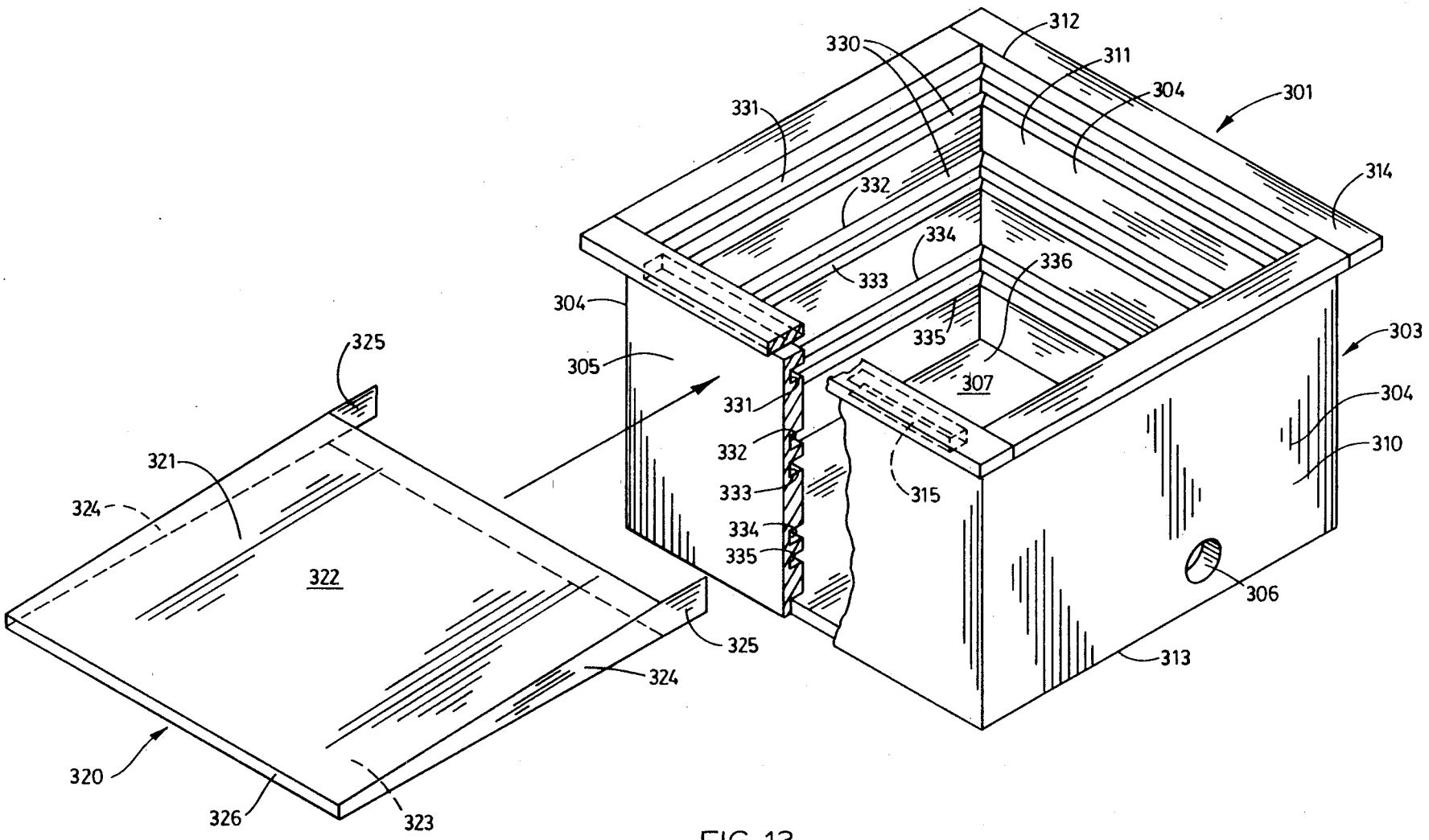
FIG. 13 is a perspective, somewhat enlarged, exploded side elevation view of a housing utilized in connection with the second form of the invention.
Figure 14:
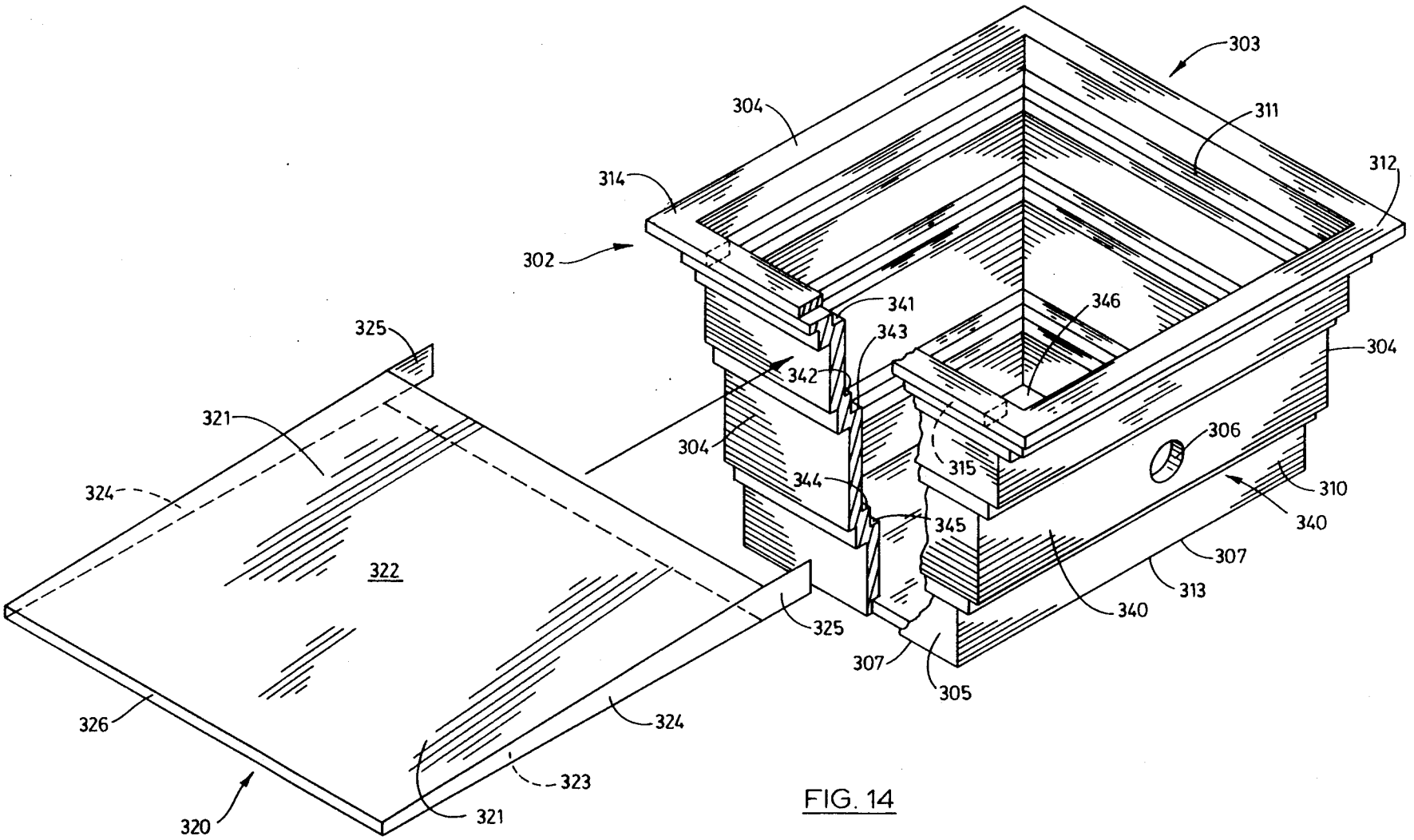
FIG. 14 is a perspective, somewhat enlarged, exploded side elevation view of an alternative housing utilized in connection with the second form of the invention.

As best seen by references to FIG. 13 and FIG. 14, a cover housing, and which is generally indicated by the numeral 320, is adapted to be fixed to the individual housings 301 and 302, respectively. The cover housing is individually operable to slidably receive an opaque cover which will be discussed in greater detail hereinafter. As best understood by reference to FIG. 12, the cover housing 320 is mounted in a position underneath the top surface 20 of the dashboard 15. The cover housing has a main body 321 which includes a top surface 322, a bottom surface 323, and a pair of sidewalls 324 join the top and bottom surface together and position them in predetermined spaced relationship one to the other. The cover housing may be manufactured as a separate subassembly, or otherwise molded or formed by conventional techniques as an integral unit. Further the cover housing may be made integral with the individual housings. As best illustrated by reference to FIG. 13 and 14, a portion 325 of the sidewalls 324 extends outwardly from the main body 321 and thereby provides a point of attachment for the cover housing to the individual housings 301 and 302, respectively. Further, the cover housing includes an end wall which is generally indicated by the numeral 326.

As best seen by reference to the drawings, the inside surface 311 of the housing 301 includes a plurality of grooves or channels 330 which are substantially continuous about the inside surface, and which are adapted to support various components which will be discussed in greater detail hereinafter. The various grooves or channels 330 define five (5) discreet levels which will be referred to as a first, second, third, fourth and fifth level, 331 through 335, respectively. Further, the bottom surface 307 defines a sixth level 336. In the case of the second housing 302, it should be understood that the main body 303 has a diminishing outside dimension which defines a plurality of steps 340 which individually form five levels which are designated by the numerals 341 through 345, respectively. Further, the bottom surface 307 forms a sixth level 346.

Figure 15:
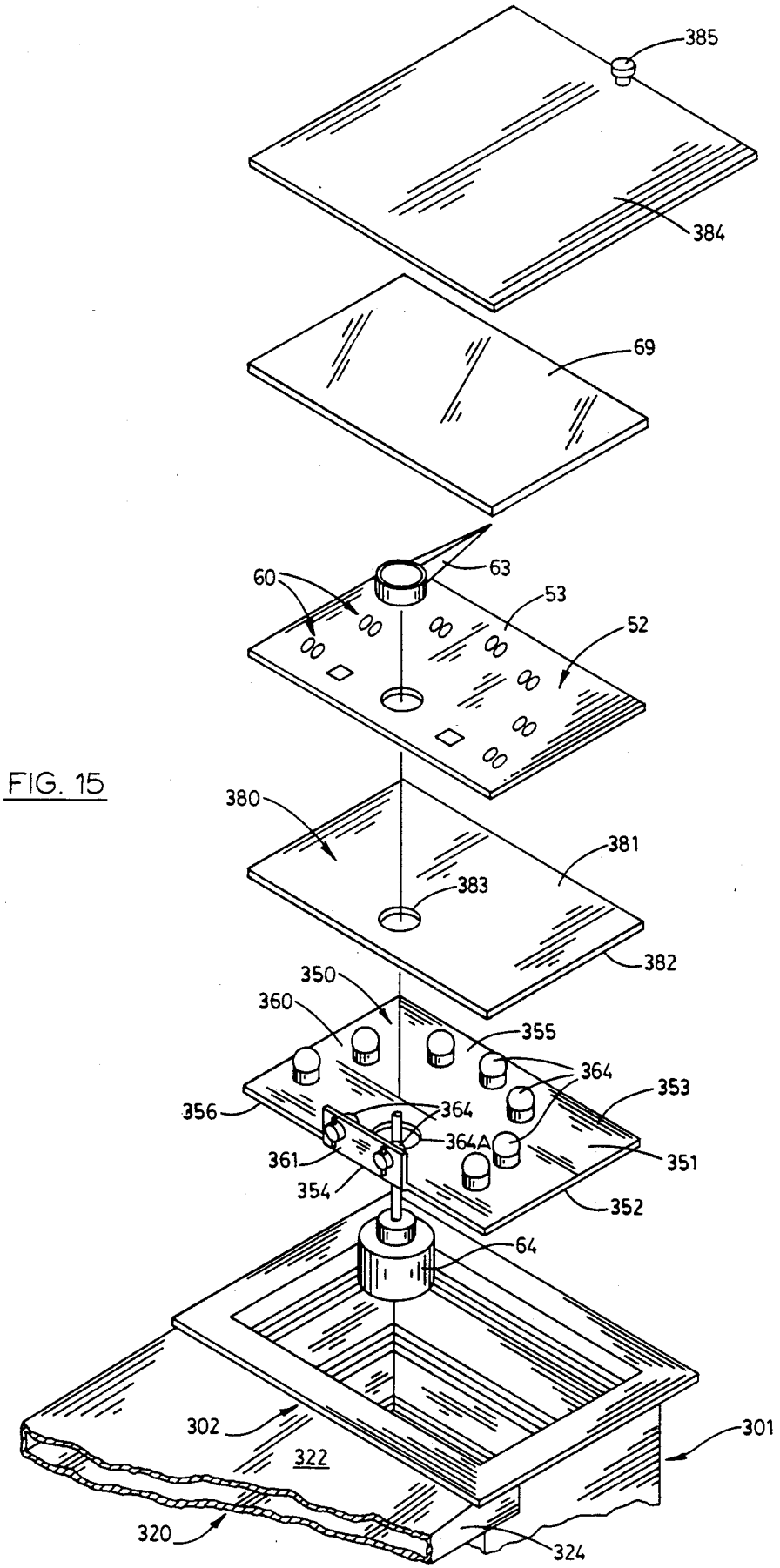
FIG. 15 is a fragmentary, perspective, exploded view of the second form of the apparatus of the present invention.

As best illustrated by reference to the exploded view of FIG. 15, the coiled spring return meter movement 64 is adapted to be mounted on the bottom surface 307 by using suitable fasteners or an adhesive (not shown). As earlier discussed, the coiled spring return meter movement is of substantially conventional design, and is operable under normal operating conditions to rotate the indicator needle 63 in a substantially clockwise direction. However a conventional coiled spring return meter movement may be rendered operable by utilizing the electronic circuit 180 for example, to move the indicator needle in a counterclockwise direction such that upon viewing the indicator needle in reflection it appears to move in a proper clockwise direction. Alternatively, a reverse coiled spring meter movement may be utilized and which is adapted to rotate the indicator needle 63 in a substantially counterclockwise direction. As earlier discussed with respect to the first form of the invention, electronic circuits 130 and 180 are provided and which are adapted to provide a voltage output to a conventional coiled spring return meter movement which varies linearly and inversely relative to the overland speed of the vehicle 11. Further, and as will be discussed in greater detail hereinafter, another electronic circuit is provided which produces a voltage output for the reverse coiled spring meter movement 64 which varies linearly relative to the overland speed of the vehicle. In any case, the electronic circuits are adapted to cause the individual coiled spring return meter movements to move the indicator needle 63 in a proper direction such that the reflection of same appears to move in an appropriate direction when viewed in reflection in the windscreen.

Figure 16:
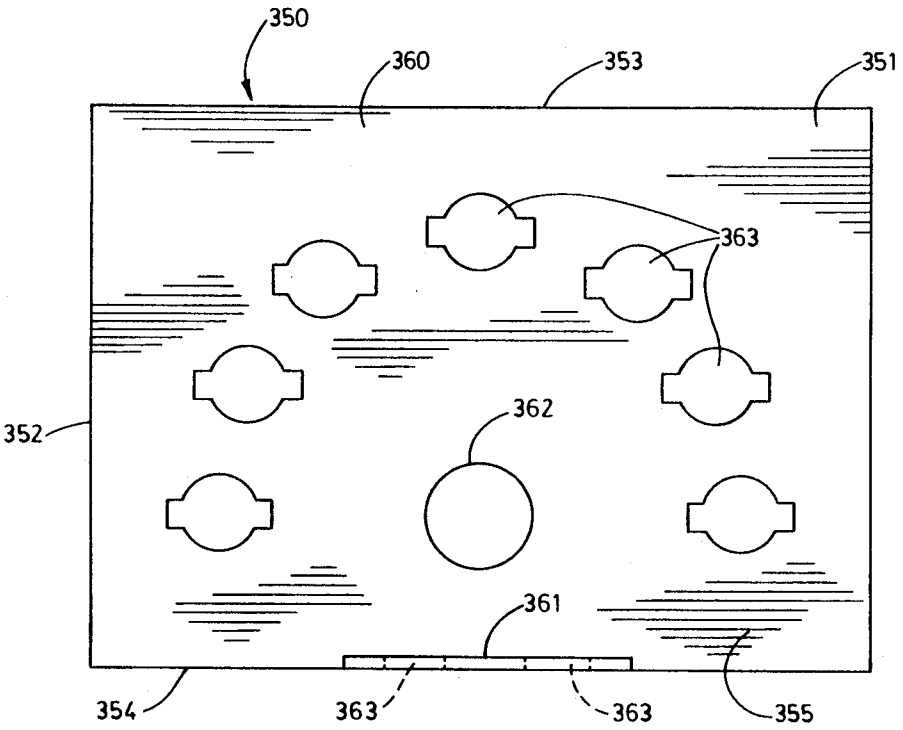
FIG. 16 is a somewhat enlarged top plan view of the lamp support plate of the second form of the present invention.

The coiled spring return meter movement 64 is mounted on the sixth level 336 and 346, respectively, and extends substantially normally and upwardly therefrom. Installed and supported on the fifth level 335 and 345, respectively, is a lamp support plate and which is generally indicated by the numeral 350. The lamp support plate may be manufactured out of assorted flexible and synthetic materials, however, and in the preferred embodiment described herein, the lamp support plate has a main body 351 which is adapted to receive suitable copper based etching which will be discussed in greater detail hereinafter. The main body 351 has a substantially rectangular shape and which is defined by a peripheral edge 352. The peripheral edge has a top portion 353, and an opposite, bottom portion 354. Further, the lamp support plate has a top surface 355, which is best seen by reference to the top plan view shown in FIG. 16, and an opposite, bottom surface 356 which is best illustrated by reference to FIG. 17. A reflective coating may be applied to the top surface. Further, the main body includes a major horizontal component 360 and a substantially vertically disposed component 361 which extends substantially normally, upwardly, relative to the top surface 355 from bottom portion 354 of the peripheral edge 352. As best illustrated by reference to FIG. 16, the main body 351 of the lamp support plate 350 has a substantially centrally disposed aperture 362 formed therein which permits the coiled spring return meter movement 64 to extend therethrough. In an alternative form of the invention, not shown, an air core gauge or meter movement may be substituted in place of the coiled spring return meter movement and mounted on the top surface 55. The air core gauge would work in the same manner as the coiled spring return meter movement 64. Further, and formed in a predetermined pattern around the centrally disposed aperture 362 is a plurality of light bulb apertures 363 which have a shape which permits them to individually receive replaceable automotive light bulbs 364 which are of conventional design. The light bulbs 364 are readily available from commercial sources. Examples of acceptable light bulbs are manufactured by General Electric under the tradename "T 2-¼ 882 auto instrument halogen light with a printed circuit socket base, and T 3-¼ PC 194 auto instrument indicator light with printed circuit socket base". The light bulbs have a design which is familiar to those skilled in the art. The light bulbs are releasably fixed to and positioned in electrical contact with the lamp support plate by being slidably received in the individual apertures and thereafter rotated in a clockwise direction. The clockwise rotation positions the individual light bulbs in current receiving relation relative to the lamp support plate. Further, and as best seen by reference to FIG. 17, the vertical component 361 includes a pair of apertures 363 which are adapted to receive light bulbs 364. As should be understood the various light bulbs are positioned in attitudes substantially in registry with or in light transmitting relation relative to various reverse printed translucent characters 60 which are printed on the display panel. Further, it should be understood that the light bulbs 364 which are mounted on the vertical component 361 are adapted to provide light for illuminating the indicator needle 63. This relationship is best imagined by a study of FIG. 9 wherein in the first form of the invention, light is delivered to the indicator needle by the optical cables or fibers 71. An aperture 364A is formed in the lamp support plate and permits the coiled spring return meter movement 64 to extend therethrough.

Figure 17:
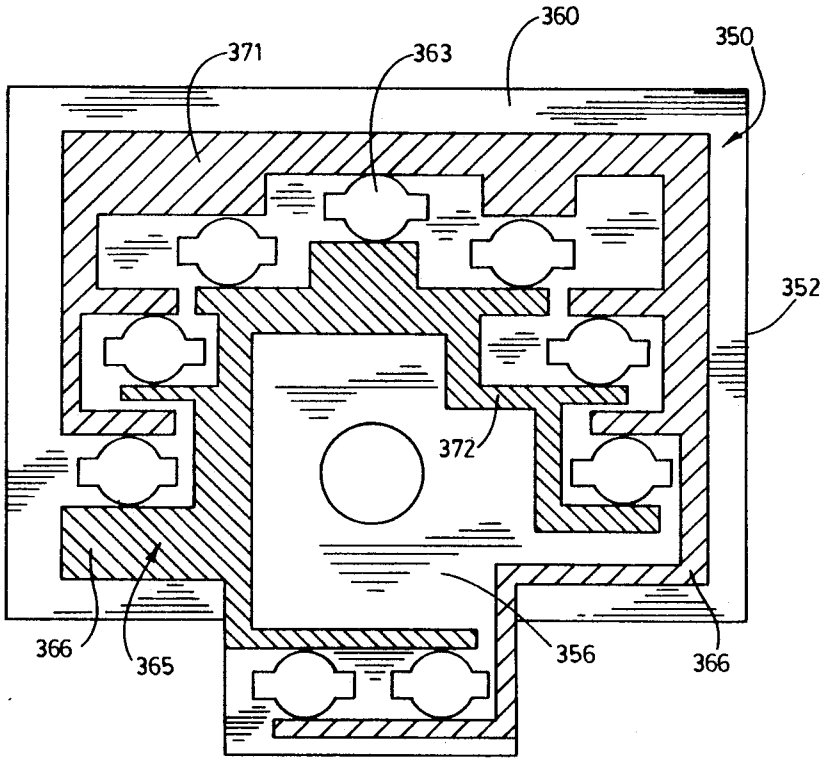
FIG. 17 is a somewhat enlarged bottom plan view of the lamp support plate of the second form of the present invention.

As best understood by a study of FIG. 17, the bottom surface 356 has affixed thereto by etching or other suitable bonding, or manufacturing technique a conductive pathway 366 which includes a first pathway 371 and a second pathway 372. Alternatively the conductive pathway may be located on the top and bottom surface in particular applications. As should be understood, the first pathway is provided with electrical power from an electronic circuit which will be discussed in greater detail in the paragraphs which follow and the second pathway provides a ground. As should be evident by a study of FIG. 17, and when the individual light bulbs 364 are twisted into an appropriate position wherein they are disposed in electrical contact with the 50 can illuminate the individual light bulbs 364. The electronic circuit which selectively activates the individual light bulbs 364 will be discussed in greater detail hereinafter.

Mounted in spaced relationship relative to the lamp support plate 350 and at the fourth level 334 and 344 is a barrier plate which is generally indicated by a numeral 380. The barrier plate is manufactured from a transparent substance such as glass, polycarbonate or other similar materials. The barrier plate 380 provides an insulating means for blocking the heat generated by the individual light bulbs 364. The barrier plate 380 includes a main body 381 which is defined by a peripheral edge 382 that is supported by the individual housings 301, or 302. Further, an aperture 383 is formed in a predetermined position in the main body and permits the coiled spring return meter movement 64 to extend therethrough. This relationship is seen most clearly by reference to FIG. 15. The analog display face 52 is mounted in spaced relationship relative to the barrier plate and at the third level 33 or 343. The analog display face was discussed in significant detail earlier. In the present form of the invention a reflective coating may be applied to the bottom surface of the display face and which is adapted, in combination with a reflective coating applied to the top surface 355 of the lamp support plate to provide a means for reflecting light onto the individual translucent characters 60. Mounted in spaced relationship relative to the analog display face 52 and at the second level 332 or 342 is the dust cover or glass panel 69. This also was discussed earlier. As best illustrated by reference to FIG. 15 an opaque cover 384 is slidably mounted on the first level 331 or 341 and has affixed thereto a knob or handle 385 which may be grasped by the operator 14. The opaque cover is moveable along a substantially horizontally disposed path of travel from a first position wherein it is located in the cover housing 320, to a second position wherein it completely covers the display face 52 thereby preventing sunlight from impacting upon or reaching same. The opaque cover permits the operator 14 to deactivate the HEADS-UP device when desired. Further, the opaque cover provides a means by which the deleterious effects of heat generated by sunlight impacting on the instrument display may be dissipated or minimized when the automobile 11 is parked for prolonged periods of time in direct sunlight.

Figure 18:
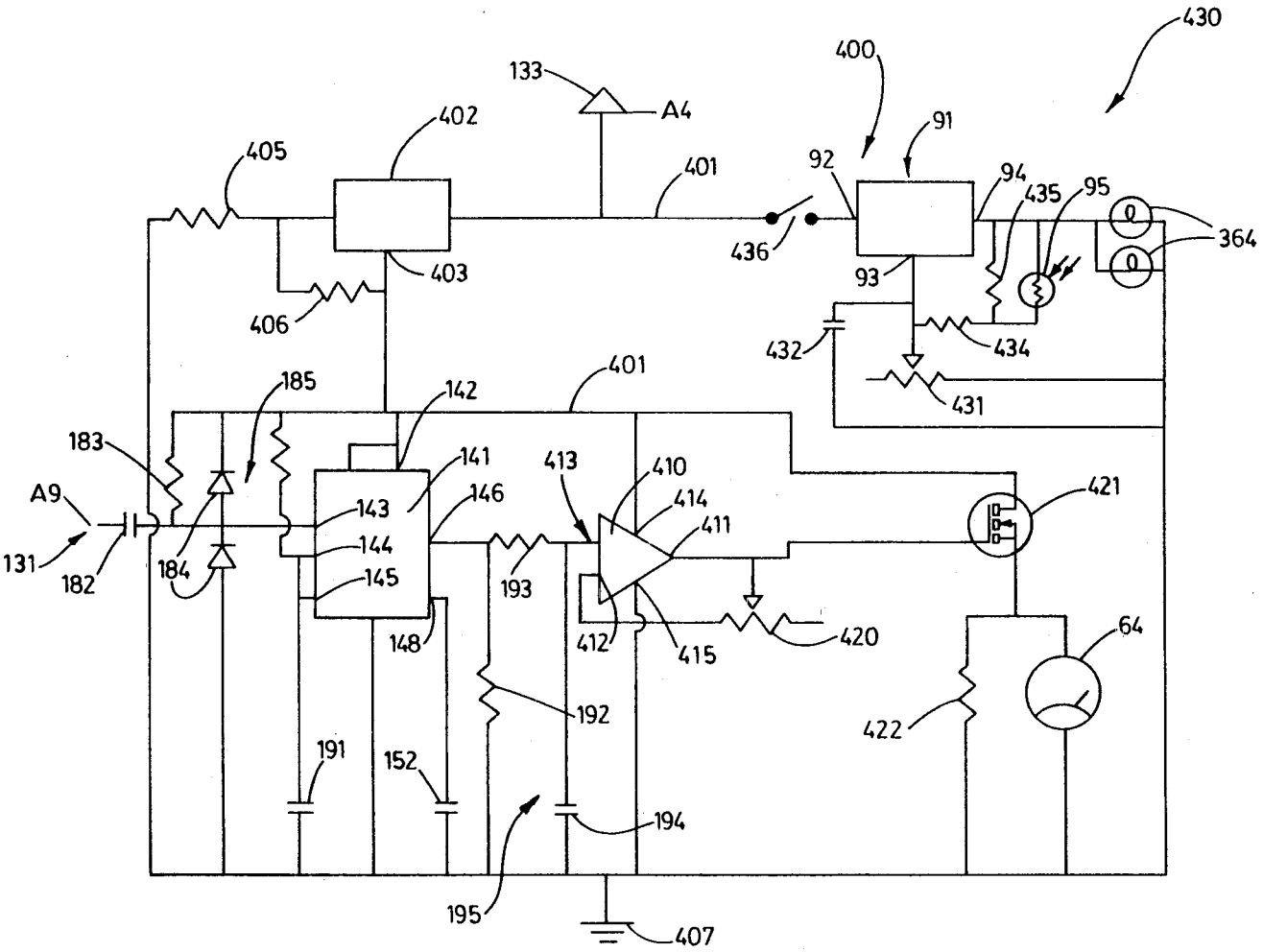
FIG. 18 is a schematic diagram of a fourth electronic circuit employed in connection with the present invention.

An electronic circuit 400 for controlling the movement of a reversed coiled spring return meter movement 64 such that it rotatably moves the indicator needle 63 in a proper direction such that the reflection of the indicator needle appearing in the windscreen appears to move in an appropriate direction when viewed in reflection from the operator's position 12 is best seen by reference to FIG. 18. The electronic circuit 400 includes a plurality of electrical conductors 401. The electronic circuit 400 receives the electronic pulses 131 which indicates the overland speed of the vehicle 11 at a location in the vehicle that is designated as A9. Further, the electronic circuit receives a source of 12 volt power 133 through the electrical conductors 401 and which is supplied by the vehicle's battery, not shown, and which may be accessed in the vehicle at a location which is designated A4 (133). The source of 12 volt power is supplied to an adjustable voltage regulator 402 which, in the preferred embodiment, is an LM317 semiconductor chip or its equivalent and which is commercially available through retail electronic stores nationwide. It should be understood that the LM317 is adjusted to provide a substantially constant 10 volt output 403 which is supplied to the electronic circuit 400. The voltage regulator 402 includes an input 404 and further is electrically connected with a 3.3K ohm resistor 405 and a 470 ohm resistor 406, the values of the resistors 405 and 406 determine the voltage output value 403 of the voltage regulator 402. The electronic circuit 400 includes a 0.01 microfarad capacitor 182 which is conductively joined to the source of electrical pulses produced by the vehicle A9 [131]. Further, the electronic circuit 400 includes a 10K ohm resistor 183 and a pair of diodes 184 which are electrically connected together to form a differentiator or signal modifier means 185 which is adapted to modify the vehicle electrical pulses in a manner to form electrical pulses having a predetermined wave form and amplitude. As shown herein, the electrical pulses produced by the signal modifier means 185 has an amplitude of not greater than the voltage output produced by the voltage regulator 402. In this embodiment the voltage output is adjusted to approximately 10 volts.

The electronic circuit 400 includes a 100K ohm resistor 190 and a 0.1 microfarad capacitor 191 which are electrically connected to a 555 IC monostable 141 in the manner as best shown by reference to FIG. 18. Further, the electronic circuit 401 includes a 3.3K ohm resistor 192. The electronic circuit has a 100K ohm resistor 193 and a 2.2 microfarad capacitor 194 which comprise an integrator means and which is generally indicated by the numeral 195, and which is adapted to receive the electrical pulses which are produced by the 555 IC 141, and which forms an integrated voltage output. The electronic circuit 400 of the present invention includes a quad operational amplifier which is generally indicated by the numeral 410 and which is commercially available through retail electronic stores nationwide under the trade designation "LM324" or its equivalent. Alternatively a semiconductor chip having a single operational amplifier may be employed. In the present electronic circuit, the electronic circuit 400 utilizes only one of the four operational amplifiers available and, therefore, for simplicity, only the single operational amplifier is shown. The operational amplifier 410 includes first, second, third and fourth pins 411 through 414, respectively. Pin 11 of the operational amplifier is designated by the numeral 415. As best illustrated by reference to FIG. 18, the operational amplifier 410 is electrically connected with the integrator means 195 and with the source of power produced by the voltage regulator 402. Further, the operational amplifier is adapted to produce a voltage output at Pin 411 which is substantially linearly related to the pulse rate of the vehicle 11. In the embodiment shown in FIG. 18, the calibration means includes a variable resistor having a 100K ohm resistance value. As should be understood, the variable resistor is operable to control the gain of the operational amplifier and its maximum voltage output for the operational amplifier 410 (approximately 7.5 volts) thereby rendering a MOSFET transistor 421 capable of controlling the reverse coiled spring meter movement 64 which positions the indicator needle 63 in a predetermined position on the display face to properly indicate the overland speed of the vehicle 11. As best seen by reference to FIG. 18, an "N" type MOSFET transistor 421 provides a current controller means which is electrically coupled to the output of the operational amplifier 410. The current controller means 421 is also electrically coupled with the reverse coiled spring meter movement 64 and provides same with a maximum voltage of 3.7 volts. However it should be understood that different meter movements may have different voltage requirements and therefore the calibration means are provided. A 470K ohm resistor 422 is electrically coupled with the MOSFET transistor 421 in the manner as best illustrated by reference to the drawings.

A second electronic circuit for selectively activating the light bulbs 364 is generally indicated by the numeral 430. The electronic circuit 430 includes a voltage regulator 91 which was described earlier as an LM350 and which is commercially available nationwide. The LM350 is electrically coupled with a 10K ohm variable resistor 431 which is of the wheel type and which may be manipulated by the operator 14. Electrically coupled to the LM350 is a 57 microfarad capacitor 432 and a 1K ohm resistor 435. Further, a 470 ohm resistor 434 and a photoresistor 95 are electrically coupled to the LM350 and a switch 436 is positioned between the input 92 and the source of 12 volt power 133. In this fashion, the switch 436 permits the light control circuit 430 to be deactivated under appropriate environmental circumstances. This electronic circuit provides the same advantages as described earlier with regards to the electronic circuit 79.

Figure 19:
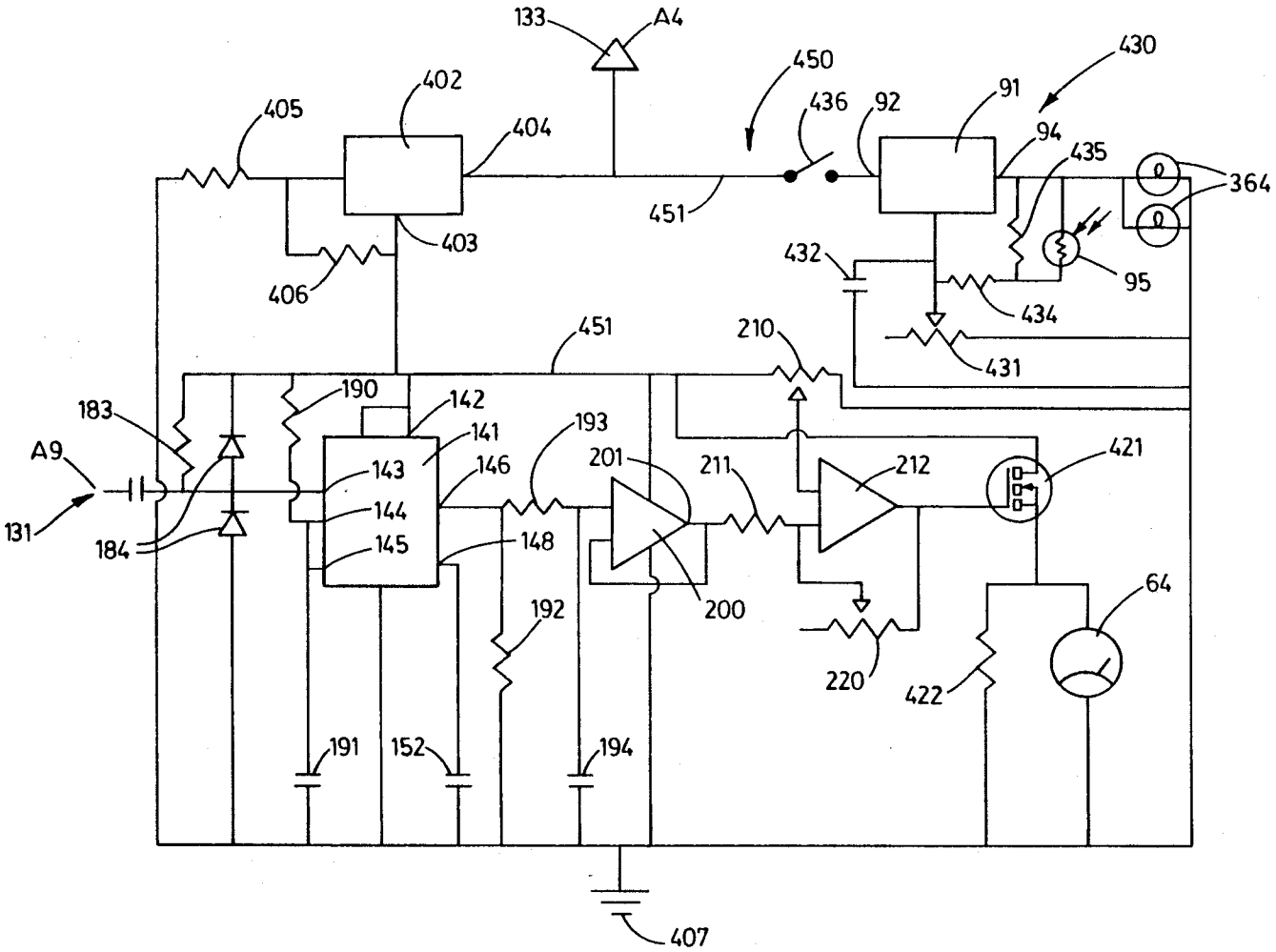
FIG. 19 is a schematic diagram of a fifth electronic circuit employed in connection with the present invention.

As best illustrated by reference to FIG. 19, a third electronic circuit 450 is employed in connection with the present invention and which is adapted to actuate the coiled spring return meter movement 64 in a manner wherein it moves the indicator needle 63 in an appropriate direction when viewed from the operator's position. As should be understood, there are substantial similarities between the electronic circuit 180 shown in FIG. 11 and that shown in FIG. 19. For purposes of brevity, therefore, only those features which distinguish the two circuits are discussed in detail herein. The third electronic circuit 450 includes a voltage regulator 402 which was described in detail with respect to the electronic circuit 400. Further, the light control circuit 430 which was described earlier is identical in this embodiment of the invention. However, it should be noted that in comparison with the electronic circuit 180 shown in FIG. 11, the first operational amplifier 200 receives power from the voltage regulator 402 as opposed to the source of 12 volt power 133 as shown in FIG. 11. Further, the variable resistor 210 is electrically coupled with the voltage output 403 of the voltage regulator 402 as opposed to the source of 12 volt power 133 as shown in FIG. 11. The electronic circuit 450 further utilizes a current controller means 421 which includes a MOSFET "N" type transistor which is coupled with a 470 ohm resistor 422. In the same fashion as that previously discussed with respect to the electronic circuit 180 shown in FIG. 11, the electronic circuit 450 is operable to actuate the coiled spring return meter movement 64 to move the indicator needle 63 in a counterclockwise direction such that it appears to move in an appropriate direction when viewed in reflection from the operator's position.

OPERATION

First and Second Form

The operation of the described embodiments of the present invention is believed to be readily apparent and is briefly summarized at this point. The instrument display apparatus 10 and 300 for use in combination with a substantially transparent panel or windscreen 25, is best illustrated by reference to FIG. 1 and 12. As shown therein, the analog instrument display 52 is borne by the dashboard 15 and positioned such that incoming rays of natural light 110 can be reflected from the top surface 53 thereof. As earlier discussed, the display face includes a multiplicity of reverse printed translucent characters which are adapted to reflect the ambient natural light onto the substantially transparent windscreen 25. The reverse printed characters 60 which constitute a first portion of the analog display are adapted to produce reflected or emitted light in a predetermined frequency range which is attenuated by the tint field 41 such that the reflected image appearing in the windscreen 25 is substantially free of all secondary or "ghost images".

The preferred embodiments of the present invention include a predetermined tint field 41 which is borne by the windscreen 25, and which is adapted to selectively absorb the frequencies of light produced by the characters 60 whereby the reflected image of the characters appear in a predetermined location on the windscreen such that may be observed within the line of sight of the operator 14. The apparatus 10 and 300 further includes an auxiliary lighting assembly 70 and 350 which is adapted to produce artificial light which is selectively delivered to the individual translucent characters 60 by way in the first embodiment, of a light manifold 71 which is composed of a plurality of optical fibers 72. As earlier discussed, and as seen in the second form of the invention 300, the light manifold may not be necessary in certain applications. In addition to the foregoing, means are provided for selectively activating the auxiliary lighting assembly 70 and 350 such that the individual translucent characters are artificially illuminated. This is accomplished by means of an electronic circuit 79 and 430 which are individually adapted to selectively actuate the light source 75 and the light bulbs 364 such that light energy may be transmitted to the individual characters with the result that they may be viewed in reflection in the predetermined tint field 41, regardless of the level of ambient natural light present. It should be understood, therefore, that as a vehicle 11 passes in and out of shaded areas, the photosensor 95 is adapted to trigger the operation of the electronic circuit 79 and 430 such that predetermined amounts of 12 volt power is supplied to the high intensity Halogen light source 75 and 364, thus causing light energy to be emitted by the translucent characters such that a reflection of the individual characters may be seen in the predetermined tint field regardless of the ambient lighting conditions. During normal daylight hours, the ambient natural light 110 coming through the windscreen 25 supplies a large percentage of the light necessary to produce a reflected image which can be clearly seen in the tint field 41 of the windscreen 25.

Electronic circuits 130, 180 and 450, respectively, comprise individual controlling means which are operable to convert electrical pulses 131 which are produced by the vehicle 11 as a function of its overland speed, and convert the electrical pulses into a predetermined voltage which varies linearly and inversely relative to the electrical pulse rate, or, alternatively, just linearly (400) and which actuates the coiled spring return meter movement 64 to urge the indicator needle 63 to rotate in a proper direction such that a reflection of indicator needle 63 appears to move in an appropriate direction when it is viewed from the operators position 12.

Therefore, the instrument display apparatus 10 of the present invention is particularly well suited for use in all manner of overland vehicles, aircraft and watercraft, is adapted to produce a reflected image which may be seen under all ambient lighting conditions, which can be mounted on a vehicle as standard equipment or can be produced in the manner of a retrofit, is compact, and easy to assemble and maintain.

Although the invention has been herein shown and described in what is conceived to be the most practical and preferred embodiments, it is recognized that departures may be made therefrom within the scope of the invention which is not to be limited to the illustrative details disclosed.

Having described our invention, what we claim as new and desire to secure by Letters Patent is:

1. An instrument display apparatus for use in combination with a substantially transparent panel comprising:

an instrument to be displayed having a display face including a first portion which is translucent and light reflective and a second portion which provides contrast for the first portion and wherein the first portion is adapted to reflect ambient light onto the substantially transparent panel; and means for selectively supplying light to said first portion whereby said first portion may be viewed in the substantially transparent panel regardless of the level of ambient light.

2. An apparatus as claimed in claim 1 wherein said first portion defines a character, and wherein the first portion produces light in selected frequencies, and wherein an attenuation means is borne by the substantially transparent panel and is adapted to absorb the frequencies of light produced by the first portion whereby the image of the display face appears on the attenuation means.

3. An apparatus as claimed in claim 2 wherein the attenuation means includes a predetermined tint field, and wherein the first portion includes a translucent character, and the light supplying means includes a light source, a light manifold disposed in light receiving relation relative to the light source and which is adapted to transmit the light onto the character, and a sensor borne by the vehicle and adapted to actuate the light source in the absence of predetermined levels of ambient light.

4. An apparatus as claimed in claim 2 wherein the attenuation means includes a predetermined tint field, and wherein the light supplying means is borne by the vehicle and the display face is positioned between the light source and the substantially transparent panel, and wherein the light source is adapted to transmit the light onto the character, and wherein a sensor is borne by the vehicle and adapted to actuate the light source in the absence of predetermined levels of ambient light.

5. An apparatus as claimed in claim 3 or 4 wherein the tint field includes a synthetic polymer sheet which is borne by the substantially transparent panel.

6. An apparatus as claimed in claim 3 or 4 wherein the tint field includes a coating applied to the substantially transparent panel.

7. An apparatus as claimed in claim 3 or 4 wherein the tint field is made integral with the substantially transparent panel.

8. An apparatus as claimed in claim 2 wherein the display face is an analog speedometer display which is borne by a vehicle and which includes a plurality of reverse printed characters, and wherein the instrument further includes a moveable indicator needle, means for driving the needle, and means for selectively controlling the driving means in response to the speed of movement of the vehicle.

9. An apparatus as claimed in claim 8 wherein the vehicle includes an operator's position, and wherein the vehicle produces a predetermined number of discreet electrical pulses which indicates the speed of the vehicle, and wherein the driving means includes a coiled spring return meter movement, and wherein the controlling means converts the electrical pulses into a predetermined voltage which varies linearly and inversely relative to the electrical pulse rate and which actuates the return meter movement to drive the indicator needle in the proper direction when the reflection of the instrument display is viewed from the operators position.

10. An apparatus as claimed in claim 8 wherein the vehicle includes an operator's position, and wherein the vehicle produces a predetermined number of discreet electrical pulses which indicates the speed of the vehicle, and wherein the driving means includes a coiled spring return meter movement, and wherein the controlling means converts the electrical pulses into a predetermined voltage which varies linearly relative to the electrical pulse rate and which actuates the return meter movement to drive the indicator needle in the proper direction when the reflection of the instrument display is viewed from the operator's position.

11. An instrument display apparatus comprising:

a substantially transparent panel having a predetermined tint field which attenuates preselected wavelengths of light; and an instrument to be displayed positioned adjacent to the transparent panel and having a display face which is adapted to produce light in the selected wavelengths which are attenuated by the tint field whereby the image of the display face appears within the tint field.

12. An apparatus as claimed in claim 11 wherein the transparent panel is a windscreen borne by a vehicle and which includes an operator's position and wherein the tint field is located substantially within the line of sight of an operator who is located in the operator's position whereby the operator may see the image of the display face while viewing through the windscreen without substantially diverting his vision.

13. An apparatus as claimed in claim 11 wherein the instrument display face emits visible light with a peak intensity substantially within a predetermined selected band, and wherein the tint field selectively attenuates the light emitted from the display face in the predetermined selected band.

14. An apparatus as claimed in claim 13 wherein the display face includes at least one reverse printed character which is translucent and which emits light in the 625–700 nanometer band, and wherein the remainder of the display face surrounding the character provides contrast for the character.

15. An apparatus as claimed in claim 14 wherein the vehicle has a dashboard, and wherein a housing is mounted on the dashboard and the instrument is supported on the housing and is illuminated by ambient natural light, and wherein a means for artificially illuminating the character is borne by the vehicle and is operable to provide illumination for the character whereby the image of the character appears within the tint field in the absence of predetermined levels of ambient natural light.

16. An apparatus as claimed in claim 15 wherein the lighting means includes a light source borne by the vehicle, and a light manifold is operable selectively to channel light produced by the light source onto the character.

17. An apparatus as claimed in claim 16 wherein the display face has opposite forwardly and rearwardly facing surfaces, and wherein the light manifold includes at least one optical cable having input and output ends, and wherein the output end is mounted on the rearwardly facing surface of the display face and channels light onto the character, and wherein the input end is positioned in light receiving relation relative to the light source.

18. An apparatus as claimed in claim 15 wherein the lighting means includes a light source borne by the housing, and wherein the display face is positioned in light receiving relation relative to the light source, the display face positioned between the light source and the windscreen.

19. An apparatus as claimed in claim 17 or 18 wherein a sensor is borne by the vehicle and is operable selectively to actuate the light source in the absence of predetermined levels of ambient natural light.

20. An apparatus as claimed in claim 19 wherein the display face is an analog display.

21. An apparatus as claimed in claim 20 wherein the instrument receives a signal from the vehicle, and the instrument further includes, a movable indicator needle, means for driving the needle, and means for selectively controlling the movement of the needle in response to the signal received from the vehicle whereby the image of the indicator needle appearing in the tint field appears to move in a proper direction when viewed from the operator's position.

22. An apparatus as claimed in claim 21 wherein the means for driving the indicator needle includes a coiled spring return meter movement, and wherein the signal received from the vehicle includes a predetermined number of discreet electrical pulses which indicates the vehicle speed and wherein the controlling means is operable to convert the electrical pulses into a predetermined voltage which varies linearly relative to the electrical pulse rate and which actuates the return meter movement to drive the indicator needle in the proper direction when the reflection of the instrument display is viewed from the operator's position.

23. An apparatus as claimed in claim 21 wherein the display face is an analog speedometer display, and wherein the means for driving the indicator needle includes a coiled spring return meter movement, and wherein the signal received from the vehicle includes a predetermined number of discreet electrical pulses which indicates the vehicle speed, and wherein the controlling means is operable to convert the electrical pulses into a predetermined voltage which varies linearly and inversely relative to the electrical pulse rate and which actuates the return meter movement to drive the indicator needle in the proper direction when the reflection of the instrument display is viewed from the operator's position.

24. An apparatus as claimed in claim 23 wherein the vehicle has an electrical power source, and the control means comprises:

means for regulating voltage electrically connected to the vehicle's electrical power source and having an input, a ground, and an output, the voltage regulating means adapted to produce a substantially constant voltage;

means for processing the electrical pulses into substantially uniform electrical pulses connected to said voltage regulator means and having an input connected to the vehicle for receiving the electrical pulses, and an output and a ground;

an amplifier having an input, an output, and a ground, and wherein the input of the amplifier is electrically connected to the output of the voltage regulating means and the output is electrically connected to the return meter movement; and means for calibrating the control means electrically connected to the amplifier whereby the amplifier supplies voltage to the return meter movement which is inversely and linearly related to the vehicle electrical pulse rate.

25. An apparatus as claimed in claim 24 wherein the amplifier acts as a low band pass filter and an integrator and wherein the calibrating means includes first and second potentiometers, the first potentiometer adapted to regulate the minimum output voltage of the amplifier, and the second potentiometer adapted to regulate the maximum voltage output of the amplifier.

26. An apparatus as claimed in claim 25 wherein the voltage regulator means is a 7805 semiconductor chip which is operable to produce a substantially constant 5 volts, and wherein the processing means is a 555 semiconductor chip which acts as a monostable to receive the electrical pulses produced by the vehicle and produce a series of pulses having a magnitude of not greater than 5 volts, and a predetermined duration.

27. An apparatus as claimed in claim 26 wherein the amplifier is a 3130 semiconductor chip, and wherein the first and second potentiometers are variable resistors each having a value of 100K ohms.

28. An apparatus as claimed in claim 27 wherein the first potentiometer sets a minimum voltage output for the operational amplifier in a range of approximately 0 through 0.3 volts and the second potentiometer sets a maximum voltage output for the operational amplifier of approximately 1.4 volts.

29. An apparatus as claimed in claim 28 wherein the 3130 semiconductor chip acts as a two pole low band pass filter.

30. An apparatus as claimed in claim 24 wherein the amplifier is a noninverting amplifier and wherein the calibrating means includes a potentiometer which is adapted to regulate the gain and the maximum voltage output of the amplifier.

31. An apparatus as claimed in claim 30 wherein the voltage regulator is a LM317 semiconductor chip which is adjusted to produce a substantially constant voltage and wherein the processing means is a 555 semiconductor chip which acts as a monostable to receive the electrical pulses produced by the vehicle and produce a series of pulses having a predetermined magnitude and a predetermined duration.

32. An apparatus as claimed in claim 31 wherein the amplifier is an operational amplifier and wherein the potentiometer is a variable resistor having a value of 100K ohms.

33. An apparatus as claimed in claim 32 wherein a means for controlling current has an input electrically coupled with the output of the operational amplifier, and an output which is electrically coupled with the coiled spring return meter movement, and wherein the current controller means includes a MOSFET "N" Type transistor and a resistor having a predetermined value.

34. An apparatus as claimed in claim 23 wherein the vehicle has an electrical power source and the control means comprises:

means for regulating voltage electrically connected to the vehicle's electrical power source and having an input, a ground, and an output, the voltage regulating means adapted to produce a substantially constant voltage;

means for modifying the electrical pulses electrically connected to the voltage regulating means and with the vehicle and which is operable to modify the electrical pulses in a manner to form electrical pulses having a predetermined wave form and amplitude;

means for processing the electrical pulses into substantially uniform electrical pulses electrically connected to the voltage regulator means, and having an input electrically connected to the modifier means, and an output;

means for integrating the electrical pulses and forming an integrated voltage output, the integrating means electrically connected with the output of the processing means;

a first amplifier having an input, and an output, and wherein the input is electrically connected with the integrated voltage output of the integrator means, and which is adapted to produce a voltage output which is substantially linearly related to the pulse rate of the vehicle;

a second amplifier having an input, an output, and wherein the input is electrically connected with the output of the first amplifier, and the output is electrically connected to the return meter movement; and means for calibrating the control means electrically connected to the first and second amplifiers whereby the second amplifier supplies a predetermined voltage to the return meter movement which is inversely and linearly related to the vehicle's electrical pulse rate.

35. An apparatus as claimed in claim 34 wherein the voltage regulator means includes a 7805 IC which is adapted to produce a substantially constant 5 volts, and wherein the modifier means includes a pair of diodes and a resistor having predetermined values and which are adapted to produce modified electrical pulses having the predetermined wave form, and wherein the amplitude of the modified electrical pulses are not greater than 5 volts.

36. An apparatus as claimed in claim 35 wherein the processing means includes a 555 IC which acts as a monostable and which produces electrical pulses having a magnitude of not greater than 5 volts and a predetermined duration, and wherein the integrating means includes a resistor and a capacitor having values of 100K ohms and 2.2 microfarads, respectively.

37. An apparatus as claimed in claim 36 wherein the first and second amplifiers are operational amplifiers which are made integral with an LM324 quad-operational amplifier, and wherein the calibration means includes first and second variable resistors having values of 100K ohms, respectively.

38. An apparatus as claimed in claim 37 wherein the first variable resistor sets the maximum voltage output for the second amplifier in a range of approximately 1.4 volts and the second variable resistor sets the minimum voltage output for the second amplifier of approximately 0 through 0.3 volts.

39. An apparatus as claimed in claim 34 wherein the voltage regulator means includes a LM317 semiconductor chip which is adapted to produce a substantially constant voltage and wherein the modifier means includes a pair of diodes and a resistor having predetermined values and which are adapted to produce modified electrical pulses having the predetermined wave form and wherein the amplitude of the modified electrical pulses is not greater than the voltage output value of the LM317.

40. An apparatus as claimed in claim 39 wherein the processing means includes a 555 IC which acts as a monostable and which produces electrical pulses having a magnitude not greater than the voltage output produced by the LM317 and a predetermined duration, and wherein the integrating means includes a resistor and a capacitor having values of 100K ohms and 2.2 microfarads, respectively.

41. An apparatus as claimed in claim 40 and wherein the first and second amplifiers are operational amplifiers which are made integral with an LM324 quad operational amplifier and wherein the calibration means includes first and second variable resistors having values of 100K ohms, respectively.

42. An apparatus as claimed in claim 41 wherein the first variable resistor sets the maximum voltage output for the second amplifier in a range of approximately 7.5 volts and the second variable resistor sets the minimum voltage for the second amplifier of approximately 0 through 0.3 volts.

43. An apparatus as claimed in claim 34 and wherein a means for controlling current is electrically connected to the second operational amplifier and with the coiled spring return meter movement, and wherein the current controller means includes a MOSFET "N" Type transistor which provides a predetermined output voltage to the coiled spring return meter movement.

44. An apparatus as claimed in claim 11 wherein the tint field includes a synthetic polymer sheet secured on the substantially transparent panel.

45. An apparatus as claimed in claim 11 wherein the tint field includes a coating applied on the inside surface of the transparent panel.

46. An apparatus as claimed in claim 11 wherein the tint field is made integral with the transparent panel.

47. An instrument display apparatus for a vehicle having an operator's position, a dashboard, and a windscreen mounted adjacent to the dashboard, the apparatus comprising:

a housing fixed on the dashboard;

an instrument mounted on the housing and positioned adjacent to the windscreen, the instrument having a display face including at least one character which reflects ambient natural light at selected frequencies;

a predetermined tint field borne by the windscreen and positioned in adjacent space relation relative to the display face, the tint field adapted to absorb the frequencies of light reflected by the character; and means for selectively illuminating the character in the absence of predetermined levels of ambient natural light, said illuminating means borne by the housing and causing said character to emit light in the frequencies absorbed by the tint field, and wherein a reflection of the character appears in the tint field such that it may be viewed from the operator's position as an operator looks through the windscreen.

48. An apparatus as claimed in claim 47 wherein the display face is an analog speedometer display having a movable indicator needle, and wherein the analog speedometer display has a multiplicity of reverse printed, translucent characters which emit light in the frequencies absorbed by the tint field, and wherein the remainder of the analog speedometer display face surrounding the characters provides contrast for the individual characters.

49. An apparatus as claimed in claim 48 wherein the individual characters emit light with a peak intensity in a predetermined frequency band, and wherein the illuminating means includes a light source which is borne by the housing, and wherein the light source delivers the light onto the individual characters, and wherein means are provided for selectively actuating said light source in the absence of predetermined levels of ambient natural light.

50. An apparatus as claimed in claim 49 wherein a coiled spring return meter movement is borne by the housing and is operable selectively to move the indicator needle to predetermined indicating positions along the display face, and wherein the vehicle produces a predetermined number of electrical pulses which indicates the speed of the vehicle, and wherein an electric circuit means is borne by the vehicle and is adapted to receive and process the electrical pulses into a source of voltage for actuating the meter movement which varies linearly and inversely relative to the rate of electrical pulsing.

51. An apparatus as claimed in claim 50 and wherein the source of voltage for activating the meter movement varies linearly relative to the rate of electrical pulsing.

52. An apparatus as claimed in claim 50 wherein the electric circuit means comprises:

a source of voltage borne by the vehicle;

a voltage regulator connected with the source of voltage and producing a substantially constant voltage output;

a monostable semiconductor chip connected in electrical pulse receiving relationship relative to the vehicle and in voltage receiving relation relative to the voltage regulator, the monostable semiconductor chip producing substantially uniform electrical pulses having a substantially uniform amplitude and a predetermined duration;

an amplifier disposed in electrical pulse receiving relationship relative to the monostable semiconductor chip and in voltage transmitting relation relative to the return meter movement, the operational amplifier producing an output voltage which varies linearly relative to the electrical pulse rate; and means for calibrating the output voltage of the amplifier whereby the return meter movement is operable to move the indicator needle to selective locations along the display face which correctly indicates the overland speed of the vehicle.

53. An apparatus as claimed in claim 52 wherein the voltage regulator is a 7805 semiconductor chip and the monostable semiconductor chip is a 555 semiconductor chip.

54. An apparatus as claimed in claim 53 wherein the amplifier is a 3130 semiconductor chip and the calibration means includes first and second potentiometers which are individually operable to adjust the minimum and maximum voltage output of the 3130 semiconductor chip, and wherein the operational amplifier produces an output voltage which varies linearly and inversely relative to the electrical pulse rate.

55. An apparatus as claimed in claim 54 wherein the first and second potentiometers are variable resistors having individual resistance values of substantially 100K ohms.

56. An apparatus as claimed in claim 52 wherein the voltage regulator is a LM317 semiconductor chip and the monostable conductor chip is a 555 semiconductor chip.

57. An apparatus as claimed in claim 56 wherein the amplifier is an operational amplifier borne by an LM324 semiconductor chip and the calibration means includes a potentiometer which is individually operable to adjust the gain and maximum voltage output of the operational amplifier.

58. An apparatus as claimed in claim 57 and wherein a means for controlling current is electrically connected to the operational amplifier and with the coiled spring return meter movement, and wherein the current control means includes an "N" type MOSFET transistor.

59. An apparatus as claimed in claim 50 wherein the electrical circuit means comprises:

a source of voltage borne by the vehicle;

a voltage regulator connected with the source of voltage and producing a substantially constant voltage;

a means for modifying the electrical pulses produced by the vehicle, said modifying means electrically connected with the vehicle and with the voltage regulator;

a monostable semiconductor chip connected in electrical pulse receiving relationship relative to the modifier means and with the voltage regulator, the monostable semiconductor chip producing electrical pulses having a substantially uniform amplitude and a predetermined duration;

means for integrating the electrical pulses produced by the monostable semiconductor chip and producing an integrated output voltage;

a first operational amplifier disposed in voltage receiving relationship relative to the integrating means, the first operational amplifier producing a voltage output which varies substantially linearly relative to the pulse rate of the vehicle;

a second operational amplifier disposed in voltage receiving relationship relative to the first operational amplifier and in voltage transmitting relationship relative to the return meter movement, the second operational amplifier producing a substantially continuous voltage output which varies linearly and inversely relative to the electrical pulse rate of the vehicle; and means for calibrating the output voltage of the second operational amplifier whereby the return meter movement is operable to move the indicator needle to a selective location along the display face which correctly indicates the overland speed of the vehicle.

60. An apparatus as claimed in claim 59 wherein the modifier means includes a resistor and a pair of diodes having predetermined values and which are operable to modify the electrical pulses to form pulses having predetermined wave forms and amplitudes.

61. An apparatus as claimed in claim 60 wherein the monostable semiconductor chip is a 555 IC and the first and second operational amplifiers are made integral with an LM324 quad operational amplifier, and wherein the calibrating means includes first and second potentiometers which are individually operable to adjust the maximum and minimum voltage output of the second operational amplifier.

62. An apparatus as claimed in claim 61 wherein the first and second potentiometers are variable resistors having individual resistance values of substantially 100K ohms.

63. An apparatus as claimed in claim 59 wherein the means for selectively actuating the light source is made integral with the electronic circuit means, the light source actuating means comprising:

a potentiometer borne by the vehicle and electrically connected with the source of voltage;

a voltage regulator electrically connected with the source of voltage borne by the vehicle and having an input electrically connected with the potentiometer and an output electrically connected with the light source; and a photosensor and a resistor electrically connected with the output of the voltage regulator whereby the output voltage of the voltage regulator is proportional to the resistance of the potentiometer and inversely proportional to the sum of the resistance of the photosensor and the resistor.

64. An apparatus as claimed in claim 63 wherein a capacitor is electrically connected between the resistor, the photosensor and ground and which is adapted to act as a filter.

65. An apparatus as claimed in claim 59 wherein the electronic circuit includes means for controlling current which is electrically coupled to the output of the second operational amplifier and with coiled spring return meter movement, and wherein the current controller means includes an "N" type MOSFET transistor.

66. An apparatus as claimed in claim 59 wherein the electronic circuit means includes the means for selectively actuating the light source, the light source actuating means comprising:

a source of voltage borne by the vehicle;

a switch electrically coupled to the source of voltage and having an open and closed position;

a voltage regulator having an input and an output and wherein the input of the voltage regulator is electrically coupled with the switch;

a photosensor electrically coupled with the output of the voltage regulator;

a first resistor coupled in parallel with the photosensor;

a second resistor coupled in series with the first resistor and with the photosensor;

a potentiometer electrically coupled with the second resistor and ground; and at least one light bulb electrically coupled to the output of the voltage regulator and wherein when the switch is in the closed position the voltage regulator produces an output voltage which is proportional to the resistance of the potentiometer and inversely related to the resistances of the photosensor and the first and second resistors.

67. An apparatus as claimed in claim 49 wherein the light actuating means comprises:

a source of voltage borne by the vehicle;

a potentiometer electrically connected with the source of voltage;

a switch electrically connected with the potentiometer;

a voltage regulator having an input electrically connected with the switch and potentiometer, and an output electrically connected with the light source; and a photosensor and a resistor electrically connected with the output of the voltage regulator whereby the output voltage of the voltage regulator is proportional to the resistance of the potentiometer and inversely proportional to the sum of the resistance of the photosensor and the resistor.

68. An apparatus as claimed in claim 67 wherein a capacitor is electrically connected between the resistor, the photosensor, and ground, and is operable to act as a filter.

69. An apparatus as claimed in claim 49 wherein the light actuating means comprises:

a source of voltage borne by the vehicle;

a switch electrically coupled to the source of voltage and having an open and closed positions;

a voltage regulator having an input and an output and wherein the input of the voltage regulator is electrically coupled with the switch;

a photosensor electrically coupled with the output of the voltage regulator;

a first resistor coupled in parallel with the photosensor;

a second resistor coupled in series with the first resistor and with the photosensor;

a potentiometer electrically coupled with the second resistor and ground; and a light source electrically coupled to the output of the voltage regulator and wherein when the switch is in the closed position the voltage regulator produces an output voltage which is proportional to the resistance of the potentiometer, and inversely related to the resistance of the photosensor.

70. An apparatus as claimed in claim 69 and wherein a capacitor is electrically coupled to the voltage regulator and is operable to act as a filter.

* * * * *